United States Patent
Ringold et al.

(10) Patent No.: US 9,689,114 B2
(45) Date of Patent: Jun. 27, 2017

(54) STRENGTHENING RESINS FOR PAPER PRODUCTS

(71) Applicant: Georgia-Pacific Chemicals LLC, Atlanta, GA (US)

(72) Inventors: Clay E. Ringold, Decatur, GA (US); Cornel Hagiopol, Lilburn, GA (US); James W. Johnston, Suwanee, GA (US); Frederick S. Potter, Oxford, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 49 days.

(21) Appl. No.: 14/820,580

(22) Filed: Aug. 7, 2015

(65) Prior Publication Data

US 2016/0040011 A1  Feb. 11, 2016

Related U.S. Application Data

(60) Provisional application No. 62/034,375, filed on Aug. 7, 2014.

(51) Int. Cl.

| | | |
|---|---|---|
| *D21H 11/00* | (2006.01) | |
| *D21H 17/50* | (2006.01) | |
| *C08L 45/00* | (2006.01) | |
| *C08L 25/08* | (2006.01) | |
| *C08L 61/24* | (2006.01) | |
| *D21H 21/18* | (2006.01) | |
| *D21H 17/00* | (2006.01) | |
| *D21H 17/55* | (2006.01) | |
| *C08G 73/02* | (2006.01) | |
| *C08L 79/02* | (2006.01) | |
| *D21H 13/00* | (2006.01) | |

(52) U.S. Cl.
CPC ......... *D21H 17/50* (2013.01); *C08G 73/0286* (2013.01); *C08L 25/08* (2013.01); *C08L 45/00* (2013.01); *C08L 61/24* (2013.01); *C08L 79/02* (2013.01); *D21H 17/55* (2013.01); *D21H 17/72* (2013.01); *D21H 21/18* (2013.01); *C08L 2205/03* (2013.01)

(58) Field of Classification Search
CPC ...................................................... D21H 17/50
USPC ...................................... 162/164.3; 525/154
See application file for complete search history.

(56) References Cited

U.S. PATENT DOCUMENTS

| 2,926,116 A | 2/1960 | Keim |
|---|---|---|
| 3,058,873 A | 10/1962 | Keim |
| 3,772,076 A | 11/1973 | Keim |
| 5,338,807 A | 8/1994 | Espy et al. |
| 5,362,842 A | 11/1994 | Graves et al. |
| 5,389,716 A | 2/1995 | Graves |
| 5,914,365 A | 6/1999 | Chang et al. |
| 2012/0064323 A1 | 3/2012 | Shoemake et al. |
| 2014/0020858 A1 | 1/2014 | Ringold et al. |
| 2015/0275438 A1* | 10/2015 | Hagiopol ............... D21H 21/20 162/164.3 |

FOREIGN PATENT DOCUMENTS

| CA | 979579 A | 12/1975 |
|---|---|---|
| EP | 0488767 A2 | 6/1992 |
| GB | 865727 A | 4/1961 |

* cited by examiner

*Primary Examiner* — Terressa Boykin
(74) *Attorney, Agent, or Firm* — Ram W. Sabnis

(57) ABSTRACT

Resin compositions, products made therewith, and methods for making such resin compositions and products. The resin composition can include a polyamide-epihalohydrin resin, a cationic styrene maleimide resin, and a urea-formaldehyde resin. The polyamide-epihalohydrin resin can include a reaction product of a polyamidoamine and an epihalohydrin. The cationic styrene maleimide resin can include a reaction product of a styrene maleic anhydride copolymer and an amine compound. The product can include a fiber web and an at least partially cured resin composition. The resin composition, prior to curing, can include a polyamide-epihalohydrin resin, a cationic styrene maleimide resin, and a urea-formaldehyde resin. The polyamide-epihalohydrin resin can include a reaction product of a polyamidoamine and an epihalohydrin. The cationic styrene maleimide resin can include a reaction product of a styrene maleic anhydride copolymer and an amine compound.

20 Claims, No Drawings

STRENGTHENING RESINS FOR PAPER PRODUCTS

CROSS-REFERENCE TO RELATED APPLICATION

This application claims priority to U.S. Provisional Patent Application No. 62/034,375, filed on Aug. 7, 2014, which is incorporated by reference herein.

BACKGROUND

Field

Embodiments described generally relate to strengthening resins for paper products. More particularly, such embodiments relate to strengthening resins that can include a polyamide-epihalohydrin (PAE) resin, a cationic styrene maleimide (SMI) resin, and a urea-formaldehyde (UF) resin, products made therewith, and methods for making and using same.

Description of the Related Art

Paper is sheet material containing small, discrete fibers interconnected with one another. The fibers are usually formed into the sheet material on a fine screen from a dilute water suspension or slurry. The paper can typically be made from cellulosic fibers; however, synthetic fibers can also be used. The wet strength of paper generally refers to the resistance of paper to rupture or disintegrate when wetted with water. Paper products made from untreated cellulosic fibers exhibit a rapid decrease in wet strength when contacted with water and are generally characterized as having a low wet strength. The wet strength of a paper product made from untreated cellulosic fibers is generally only about 5% of a dry strength of the paper product. Various methods for treating the paper products and the cellulose fibers thereof have been employed to increase the wet and/or dry strength thereof. For example, strengthening, resins such as wet and/or dry strengthening resins, can often be applied to the cellulose fibers of the paper products to increase the wet and/or dry strength thereof.

The wet strengthening resins applied to the paper can be categorized as either a "permanent" type resin or a "temporary" type resin, which can be determined by the amount of time the paper retains its wet strength after contact with or immersion in water. While the wet strength retention of a paper product is a desirable property for certain applications, paper products that utilize "permanent" type wet strengthening resins often exhibit poor resistance to rupture or degradation. For example, paper products utilizing the "permanent" type wet strengthening resins can often be degraded only under undesirably severe conditions. Further, while the paper products treated with the wet strengthening resins exhibit increased wet strength, the dry strength of the paper products is generally unaffected or insignificantly increased, thereby limiting their utility in applications where both wet and dry strength is desired such as for use as packaging.

There is a need, therefore, for improved strengthening resins, products made therewith, and methods for making and using same.

SUMMARY

Resin compositions, products made therewith, and methods for making such resin compositions and products are provided. In at least one specific embodiment, the resin composition can include a polyamide-epihalohydrin resin, a cationic styrene maleimide resin, and a urea-formaldehyde resin. The polyamide-epihalohydrin resin can include a reaction product of a polyamidoamine and an epihalohydrin. The cationic styrene maleimide resin can include a reaction product of a styrene maleic anhydride copolymer and an amine compound.

In at least one specific embodiment, the resin composition can include about 10 wt % to about 70 wt % of a polyamide-epihalohydrin resin, about 10 wt % to about 70 wt % of a cationic styrene maleimide resin, and about 10 wt % to about 70 wt % of a urea-formaldehyde resin, where all weight percent values are based on a combined solids weight of the polyamide-epihalohydrin resin, the cationic styrene maleimide resin, and the urea-formaldehyde resin. The polyamide-epihalohydrin can include a reaction product of a polyamidoamine and an epihalohydrin. The cationic styrene maleimide resin can include a reaction product of a styrene maleic anhydride copolymer and an amine compound and can have a styrene to maleimide molar ratio of about 1:1 to about 5:1. The urea-formaldehyde resin can have a formaldehyde to urea molar ratio of about 0.5:1 to about 1.2:1.

In at least one specific embodiment, a fiber product can include a fiber web and an at least partially cured resin composition. The resin composition, prior to curing, can include a polyamide-epihalohydrin resin, a cationic styrene maleimide resin, and a urea-formaldehyde resin. The polyamide-epihalohydrin resin can include a reaction product of a polyamidoamine and an epihalohydrin. The cationic styrene maleimide resin can include a reaction product of a styrene maleic anhydride copolymer and an amine compound.

DETAILED DESCRIPTION

It has been surprisingly and unexpectedly discovered that combining one or more polyamide-epihalohydrin (PAE) resins, one or more cationic styrene maleimide (SMI) resins, and one or more urea-formaldehyde (UF) resins produces a resin composition that exhibits improved performance properties when mixed, blended, or otherwise contacted with fibers (e.g., cellulosic fibers). For example, the resin composition surprisingly and unexpectedly enhances both a wet strength and a dry strength of paper and paper products. Furthermore, it has been discovered that the PAE resin, the cationic SMI resin, and the UF resin, when combined with one another, produce a resin composition that exhibits a synergistic effect and provides a significant and unexpected increase in the wet tensile strength and the dry tensile strength over what would have been expected based on the individual resins alone. Without wishing to be bound by theory, it is believed that intermolecular interactions may develop between the PAE resin, the cationic SMI resin, and/or the UF resin to provide these unexpected synergistic effects.

The resin composition can be made by mixing, blending, stirring, contacting, or otherwise combining the PAE resin, the cationic SMI resin, and the UF resin with one another. The PAE resin, the cationic SMI resin, and the UF resin can be combined with one another in any order or sequence. For example, the PAE resin, the cationic SMI resin, and the UF resin can be added sequentially or simultaneously with respect to one another. In at least one example, the PAE resin can be added to a mixing vessel first, and the cationic SMI resin and the UF resin can be subsequently added, e.g., sequentially or simultaneously. In another example, the cationic SMI resin can be added to a mixing vessel first and the PAE resin and the UF resin can be subsequently added. e.g., sequentially or simultaneously. In yet another example, the UF resin can be added to a mixing vessel first, and the PAE resin and the SMI resin can be subsequently added, e.g., sequentially or simultaneously.

The resin composition can include about 1 wt %, about 2 wt %, about 3 wt %, about 5 wt %, about 10 wt %, about 15 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the PAE resin, based on the combined solids weight of the PAE resin, the cationic SMI resin, and the UF resin. For example, the PAE resin can be present in the resin composition in an amount of about 5 wt % to about 95 wt %, about 10 wt % to about 90 wt %, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 33 wt %, about 12 wt % to about 20 wt %, about 13 wt % to about 18 wt %, about 15 wt % to about 70 wt %, about 16 wt % to about 42 wt %, about 17 wt % to about 41 wt %, about 30 wt % to about 40 wt %, about 33 wt % to about 35 wt %, about 30 wt % to about 33 wt %, about 60 wt % to about 66 wt %, about 66 wt % to about 70 wt %, about 66 wt % to about 75 wt %, about 66 wt % to about 80 wt %, or about 66 wt % to about 85 wt %, based on the combined solids weight of the PAE resin, the cationic SMI resin, and the UF resin. In another example, the PAE resin can be present in the resin composition in an amount of at least 1 wt %, at least 2 wt %, at least 3 wt %, at least 5 wt %, at least 10 wt %, at least 15 wt %, at least 20 wt %, at least 25 wt %, at least 30 wt %, at least 33 wt %, at least 35 wt %, at least 40 wt %, or at least 45 wt % and less than 50 wt %, less than 55 wt %, less than 60 wt %, less than 65 wt %, less than 66 wt %, less than 70 wt %, less than 75 wt %, less than 80 wt %, less than 85 wt %, less than 90 wt %, less than 95 wt %, less than 97 wt %, or less than 98 wt %, based on the combined solids weight of the PAE resin, the cationic SMI resin, and the UF resin.

The solids or non-volatiles content of the PAE resin, the SMI resin, the UF resin, the resin composition, and other compositions can be measured by determining the weight loss upon heating a small sample, e.g., 5-8 grams of the sample, to a suitable temperature, e.g., 105° C., for a time sufficient to remove the liquid medium therefrom. By measuring the weight of the sample before and after heating, the amount of the solids or non-volatiles in the sample can be directly calculated or otherwise estimated. It should be noted that the temperature necessary to remove the liquid medium can depend, at least in part, on the particular liquid medium(s) present in the resin or other composition measured.

The resin composition can include about 1 wt %, about 2 wt %, about 3 wt %, about 5 wt %, about 10 wt %, about 15 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the cationic SMI resin, based on a combined solids weight of the PAE resin, the cationic SMI resin, and the UF resin. For example, the cationic SMI resin can be present in the resin composition in an amount of about 5 wt % to about 95 wt %, about 10 wt % to about 90 wt %, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 33 wt %, about 12 wt % to about 20 wt %, about 13 wt % to about 18 wt %, about 15 wt % to about 70 wt %, about 16 wt % to about 42 wt %, about 17 wt % to about 41 wt %, about 25 wt % to about 70 wt %, about 30 wt % to about 40 wt %, about 33 wt % to about 35 wt %, about 30 wt % to about 33 wt %, about 60 wt % to about 66 wt %, about 66 wt % to about 70 wt %, about 66 wt % to about 75 wt %, about 66 wt % to about 80 wt %, or about 66 wt % to about 85 wt %, based on the combined solids weight of the PAE resin, the cationic SMI resin, and the UF resin. In another example, the cationic SMI resin can be present in the resin composition in an amount of at least 1 wt %, at least 2 wt %, at least 3 wt %, at least 5 wt %, at least 10 wt %, at least 15 wt %, at least 20 wt %, at least 25 wt %, at least 30 wt %, at least 33 wt %, at least 35 wt %, at least 40 wt %, or at least 45 wt % and less than 50 wt %, less than 55 wt %, less than 60 wt %, less than 65 wt %, less than 66 wt %, less than 70 wt %, less than 75 wt %, less than 80 wt %, less than 85 wt %, less than 90 wt %, less than 95 wt %, less than 97 wt %, or less than 98 wt %, based on the combined solids weight of the PAE resin, the cationic SMI resin, and the UF resin.

The resin composition can include about 1 wt %, about 2 wt %, about 3 wt %, about 5 wt %, about 10 wt %, about 15 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the UF resin, based on the combined solids weight of the PAE resin, the cationic SMI resin, and the UF resin. For example, the UF resin can be present in the resin composition in an amount of about 5 wt % to about 95 wt %, about 10 wt % to about 90 wt %, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 33 wt %, about 12 wt % to about 20 wt %, about 13 wt % to about 18 wt %, about 15 wt % to about 70 wt %, about 16 wt % to about 42 wt %, about 17 wt % to about 41 wt %, about 30 wt % to about 40 wt %, about 33 wt % to about 35 wt %, about 30 wt % to about 33 wt %, about 60 wt % to about 66 wt %, about 66 wt % to about 70 wt %, about 66 wt % to about 75 wt %, about 66 wt % to about 80 wt %, or about 66 wt % to about 85 wt %, based on the combined solids weight of the PAE resin, the cationic SMI resin, and the UF resin. In another example, the UF resin can be present in the resin composition in an amount of at least 1 wt %, at least 2 wt %, at least 3 wt %, at least 5 wt %, at least 10 wt %, at least 15 wt %, at least 20 wt %, at least 25 wt %, at least 30 wt %, at least 33 wt %, at least 35 wt %, at least 40 wt %, or at least 45 wt % and less than 50 wt %, less than 55 wt %, less than 60 wt %, less than 65 wt %, less than 66 wt %, less than 70 wt %, less than 75 wt %, less than 80 wt %, less than 85 wt %, less than 90 wt %, less than 95 wt %, less than 97 wt %, or less than 98 wt %, based on the combined solids weight of the PAE resin, the cationic SMI resin, and the UF resin.

The resin composition can include about 1 wt %, about 2 wt %, about 3 wt %, about 5 wt %, about 10 wt %, about 15 wt %, about 16 wt %, about 17 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the PAE resin, about 1 wt %, about 2 wt %, about 3 wt %, about 5 wt %, about 10 wt %, about 15 wt %, about 16 wt %, about 17 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the SMI resin, and about 1 wt %, about 2 wt %, about 3 wt %, about 5 wt %, about 10 wt %, about 15 wt %, about 16 wt %, about 17 wt %, about 20 wt %, about 25 wt %, about 30 wt %, about 33 wt %, about 35 wt %, about 40 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, or about 98 wt % of the UF resin, based on the combined solids weight of the PAE resin, the cationic SMI resin, and the UF resin. In one example, the resin composition can include about 10 wt % to about 80 wt %, about 15 wt % to about 70 wt %, about 16 wt % to about 42 wt %, or about 17 wt % to about 41 wt % of the PAE resin, about 10 wt % to about 80 wt %, about 15 wt % to about 70 wt %, about 16 wt % to about 42 wt %, or about 17 wt % to about 41 wt % of the SMI resin, and about 10 wt % to about 80 wt %, about 15 wt % to about 70 wt %, about 16 wt % to about 42 wt %, or about 17 wt % to about 41 wt % of the of the UF resin.

In at least one example, the cationic SMI resin can have the chemical formula (A):

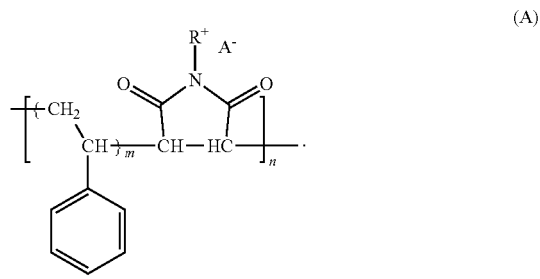

(A)

In the cationic SMI resin having the chemical formula (A), "$R^+$" can be a cationic molecular group, "$A^-$" can be an anion, "m" can be an integer for the number of styrene monomer units, and "n" can be an integer for the number of cationic SMI monomer units. The cationic molecular group "$R^+$" can include, but is not limited to, a cationic nitrogen-containing group (e.g., a cationic ammonium group), a cationic phosphorous-containing group (e.g., a cationic phosphonium group), or a mixture thereof.

In at least one example, the cationic molecular group "$R^+$" can be a cationic nitrogen-containing group bonded to the nitrogen of an imide by a substituted or unsubstituted organic diyl group (e.g., $C_1$-$C_{12}$), and which can include primary, secondary, tertiary, quaternary nitrogen compounds, such as ammonium compounds, amine compounds, aniline compounds, and other nitrogen-containing compounds. In some examples, the cationic nitrogen-containing group can include —($C_1$-$C_{12}$)$NX_{(3-y)}H_y^+$, where "—($C_1$-$C_{12}$)" can be a substituted or unsubstituted organic diyl group, "y" can be equal to 0, 1, 2, or 3, and each X can independently be a substituted or unsubstituted, linear or branched, saturated or unsaturated, cyclic, heterocyclic, or aromatic hydrocarbon, such as methyl, ethyl, propyl, butyl, pentyl, phenyl, isomers thereof, or derivatives thereof. Illustrative examples of the organic diyl group "—($C_1$-$C_{12}$)" can include, but are not limited to, methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), linear or branched, saturated or unsaturated, isomers thereof, halide-substituted derivatives thereof, or any mixture thereof. In at least one example, the organic diyl group "—($C_1$-$C_{12}$)" of the cationic SMI resin can be propanediyl, and the maleimide portion of the cationic SMI resin can be an aminopropylamine maleimide. Illustrative cationic nitrogen-containing groups, such as cationic ammonium groups, can include, but are not limited to, —($C_1$-$C_{12}$)[$NH_3$]$^+$, —($C_1$-$C_{12}$)[$NH_2(CH_3)$]$^+$, —($C_1$-$C_{12}$)[$NH(CH_3)_2$]$^+$, —($C_1$-$C_{12}$)[$N(CH_3)_3$]$^+$, —($C_1$-$C_{12}$)[$NH_2(CH_2CH_3)$]$^+$, —($C_1$-$C_{12}$)[$NH(CH_2CH_3)_2$]$^+$, —($C_1$-$C_{12}$)[$N(CH_2CH_3)_3$]$^+$, or other alkyl derivatives.

In at least one example, the cationic molecular group "$R^+$" can be a cationic phosphorus-containing group bonded to the nitrogen of the imide by a substituted or unsubstituted organic diyl group (e.g., $C_1$-$C_{12}$), and can include, but is not limited to, primary, secondary, tertiary, or quaternary nitrogen compounds, such as phosphonium compounds. In some examples, the cationic phosphorus-containing group can include —($C_1$-$C_{12}$)$PX_{(3-y)}H_y^+$, where "—($C_1$-$C_{12}$)" can be a substituted or unsubstituted organic diyl group, "y" can be equal to 0, 1, 2, or 3, and each X can be independently a substituted or unsubstituted linear, branched, cyclic, heterocyclic, or aromatic hydrocarbon, such as methyl, ethyl, propyl, butyl, pentyl, phenyl, linear or branched, saturated or unsaturated, isomers thereof, or derivatives thereof. The substituted or unsubstituted organic diyl group "—($C_1$-$C_{12}$)" of the cationic phosphorus-containing groups can be any of the chemical groups as in the cationic nitrogen-containing groups. In some examples, the substituted organic diyl group "—($C_1$-$C_{12}$)" can be propanediyl, and the maleimide portion of the cationic SMI resin can be a phosphonium propyl maleimide. Illustrative cationic phosphorus-containing groups, such as cationic phosphonium groups, can include, but are not limited to, —($C_1$-$C_{12}$)[$PH_3$]$^+$, —($C_1$-$C_{12}$)[$PH_2(CH_3)$]$^+$, —($C_1$-$C_{12}$)[$PH(CH_3)_2$]$^+$, —($C_1$-$C_{12}$)[$P(CH_3)_3$]$^+$, —($C_1$-$C_{12}$)[$PH_2(CH_2CH_3)$]$^+$, —($C_1$-$C_{12}$)[$PH(CH_2CH_3)_2$]$^+$, —($C_1$-$C_{12}$)[$P(CH_2CH_3)_3$]$^+$, or other alkyl derivatives.

In some examples, the anion "$A^-$" can include, but is not limited to, a carboxylate (e.g., [$RCO_2$]$^-$), a halide (e.g., $F^-$, $Cl^-$, $Br^-$, $I^-$), a hydroxide (e.g., [$OH$]$^-$), a chlorate anion (e.g., $ClO^-$, [$ClO_4$]$^-$), a phosphate anion (e.g., [$PO_4$]$^{3-}$, [$(RO)_3PO$]$^-$, [$PF_6$]$^-$, organic phosphates), a sulfate anion (e.g., $SO_4^{2-}$, [$F_3CSO_3$]$^-$), a borate anion (e.g., [$BF_4$]$^-$, [$BAr^F_4$]$^-$, [$B(C_6F_5)_4$]$^-$), derivatives thereof, or any mixture thereof. For example, the anion "$A^-$" can be a carboxylate, such as a conjugate base of an organic acid, that includes an acetate anion, a citrate anion, an oxalate anion, a lactate anion, a formate anion, derivatives thereof, or any mixture thereof.

The number of styrene monomer units "m" can be an integer of 1 to 20, or 1 to 10, or 1 to 5. For example, the number of styrene monomer units "m" can be 1, 2, 3, 4, 5, 6, 7, 8, 9, or 10. In another example, the number of styrene monomer units "m" can be 1, 2, or 3. The number of cationic SMI monomer units "n" can be an integer of about 5 to about 5,000, about 5 to about 1,000, about 5 to about 800, about 5 to about 500, or about 10 to about 400. For example, the number of cationic SMI monomer units "n" can be 14 (e.g., MW is about 5,000), 144 (e.g., MW is about 80,000), or 360

(e.g., MW is about 200,000). In some examples, the number of styrene monomer units "m" can be 1 and the number of cationic SMI monomer units "n" can be about 5 to about 100. In other examples, the number of styrene monomer units "m" can be 2 and the number of cationic SMI monomer units "n" can be about 20 to about 200. In other examples, the number of styrene monomer units "m" can be 3 and the number of cationic SMI monomer units "n" can be about 50 to about 300.

In at least one example, the cationic SMI resin can have a styrene to maleimide molar ratio of about 1:1 to about 20:1, about 1:1 to about 10:1, or about 1:1 to about 5:1. In some examples, the styrene to maleimide molar ratio of the cationic SMI resin can be about 1:1 to about 5:1, such as, for example, about 1:1, about 2:1, about 3:1, about 4:1, or about 5:1. In other examples, the styrene to maleimide molar ratio of the cationic SMI resin can be greater than 5:1, such as about 6:1 to about 12:1 or greater, for example, about 6:1, about 7:1, about 8:1, about 9:1, about 10:1, about 11:1, about 12:1, about 13:1, about 14:1, or greater.

As known by those skilled in art, the molecular weight of a resin can be determined using Gel Permeation Chromatography (GPC). A suitable GPC method can use an aqueous mobile phase, which can also serve as a solvent/diluent for the resin samples. Separation can be achieved with an Agilent PL aquagel-OH MIXED-H column calibrated with, for example, polyethylene glycols (PEGs) and polyethylene oxides (PEOs). A particular resin sample can be diluted and can be injected into a GPC system or an equivalent system, available from Waters Corporation. The data collected from the GPC system can be used to determine the weight average molecular weight from the calibration curve used in the normal manner with integration of the distribution curve. The method of determining the molecular weight of the resin samples is well understood by those skilled in the art and other configurations and reference materials can conveniently be used.

In at least one example, the cationic SMI resin can have a weight average molecular weight proportionally based on the styrene to maleimide molar ratio. For example, increasing the number of the styrene or the styrene monomer units "m" relative to the number of maleimide can correspondingly increase the weight average molecular weight of the cationic SMI resin. The cationic SMI resin can have a weight average molecular weight (MW, in Daltons) of about 500, about 1,000, about 2,500, about 5,000, about 10,000, about 25,000, or about 50,000 to about 75,000, about 100,000, about 200,000, about 300,000, about or about 350,000. For example, the cationic SMI resin can have a weight average molecular weight of about 500 to about 350,000, about 1,000 to about 300,000, about 2,000 to about 250,000, about 3,000 to about 200,000, about 4,000 to about 150,000, about 5,000 to about 100,000, or about 6,000 to about 50,000. In some examples, the number of styrene monomer units "m" can be 1 and the number of cationic SMI monomer units "n" can be about 5 to about 50, for example, about 14, and the weight average molecular weight can be about 5,000. In other examples, the number of styrene monomer units "m" can be 3 and the number of cationic SMI monomer units "n" can be about 120 to about 180, for example, about 144, and the weight average molecular weight can be about 80,000. In other examples, the number of styrene monomer units "m" can be 3 and the number of cationic SMI monomer units "n" can be about 320 to about 400, for example, about 360, and the weight average molecular weight can be about 200,000.

In some examples, the cationic SMI resin can have the chemical formula (B):

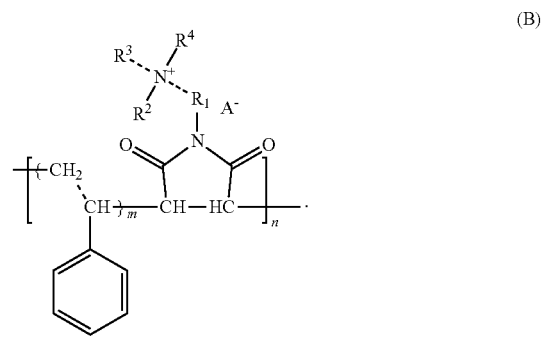

In the chemical formula (B), "$R^1$" can be a substituted or unsubstituted organic diyl group and each of "$R^2$," "$R^3$," and "$R^4$" can independently be a hydrogen or a substituted or unsubstituted linear, branched, cyclic, heterocyclic, or aromatic hydrocarbyl group. As discussed above with regard to chemical formula (A), "$A^-$" can be an anion, "m" can be an integer for the number of styrene monomer units, and "n" can be an integer for the number of cationic SMI monomer units.

In one or more examples, the organic diyl group "$R^1$" can be, but is not limited to, methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), isomers thereof, halide-substituted derivatives thereof, or any mixture thereof. In at least one example, the substituted organic diyl group "$R^1$" can be propanediyl, and the maleimide portion of the cationic SMI resin can be an aminopropylamine maleimide. If "$R^2$," "$R^3$," and/or "$R^4$" is a substituted or unsubstituted, linear or branched, cyclic, heterocyclic, or aromatic hydrocarbyl group, then each of "$R^2$," "$R^3$," and/or "$R^4$" can independently be an alkyl, alkene, alkyne, aryl, alkoxy, amino, isomers thereof, or derivatives thereof. In other examples, each of "$R^2$," "$R^3$," and "$R^4$" can independently be hydrogen, methyl, ethyl, propyl, butyl, pentyl, or derivatives thereof. In at least one example, the maleimide portion of the cationic SMI resin can be an aminopropylamine maleimide, and each of "$R^2$," "$R^3$," and "$R^4$" can independently be hydrogen, methyl, or ethyl. In some examples, the "$R^2$" can be hydrogen, "$R^3$" can be methyl, and "$R^4$" can be methyl, and the maleimide portion of the cationic SMI resin can be dimethylaminopropylamine (DMAPA) maleimide. In other examples, the "$R^2$" can be hydrogen, "$R^3$" can be hydrogen, and "$R^4$" can be methyl, and the maleimide portion of the cationic SMI resin can be methylaminopropylamine maleimide. In other examples, "$R^2$," "$R^3$," and "$R^4$" can each be hydrogen and the maleimide portion of the cationic SMI resin can be aminopropylamine maleimide.

In some examples, the cationic SMI resin can be a copolymer of styrene and DMAPA maleimide, and can have one or more of the following chemical formulas (C), (D), or (E):

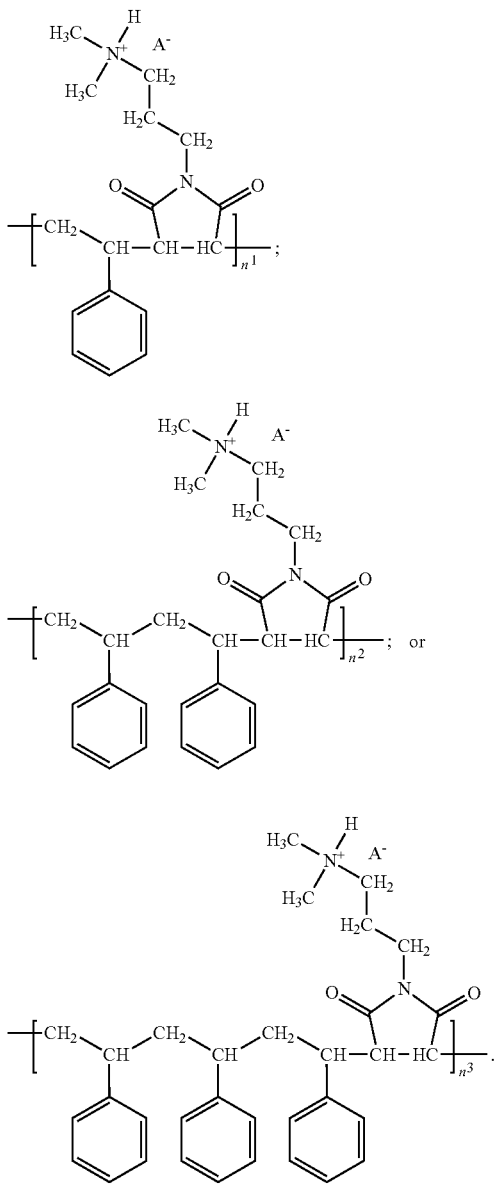

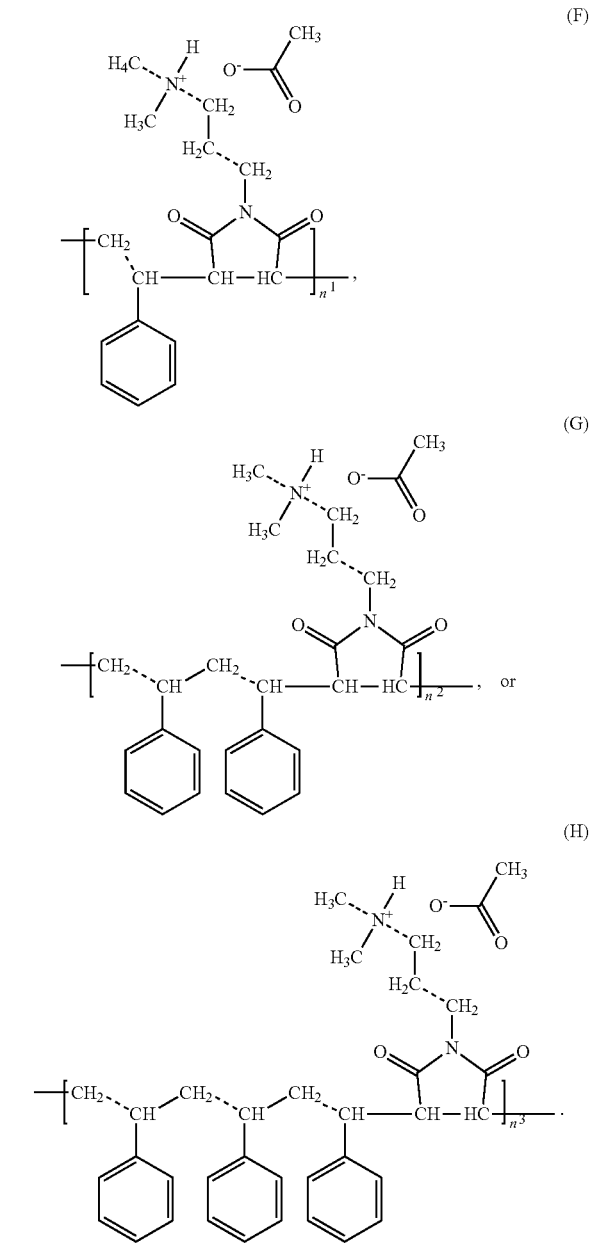

about 2,500, about 2,700, about 3,000, about 3,500, about 4,000, about 4,500, or about 5,000. In at least one example, "$n^1$" can be about 5 to about 100, "$n^2$" can be about 20 to about 200, and "$n^3$" can be about 50 to about 300.

In some examples, the cationic SMI resin can include copolymers of styrene and DMAPA maleimide, such as, for example, copolymers of styrene and DMAPA maleimide acetate. The cationic SMI resin as a copolymer of styrene and DMAPA maleimide acetate can have one or more of the following the chemical formulas (F), (G), or (H):

In the chemical formulas (C), (D), and (E), "$A^-$" can be an anion, as discussed above, and each of "$n^1$," "$n^2$," and "$n^3$" can independently be an integer for the number of cationic SMI monomer units. For example, the number of cationic SMI monomer units "$n^1$," "$n^2$," and "$n^3$" can independently be about 5 to about 6,000, about 5 to about 5,000, about 5 to about 4,000, about 5 to about 3,000, about 5 to about 2,000, about 5 to about 1,000, about 5 to about 800, about 5 to about 700, about 5 to about 600, about 5 to about 500, about 5 to about 400, about 5 to about 300, about 10 to about 400, or about 10 to about 300. In another example, the number of cationic SMI monomer units "$n^1$," "$n^2$," and "$n^3$" can independently be about 5, about 10, about 15, about 20, about 25, about 30, about 35, about 40, about 45, about 50, about 55, about 60, about 65, about 70, or about 75 to about 100, about 200, about 300, about 400, about 500, about 600, about 700, about 800, about 900, about 1,000, about 1,100, about 1,200, about 1,300, about 1,400, about 1,500, about 1,700, about 2,000, about 2,300, In the chemical formulas (F), (G), and (H), each of "$n^1$," "$n^2$," and "$n^3$" can independently be an integer of about 5 to about 5,000, about 5 to about 1,000, about 5 to about 800, such as where "$n^1$" can be about 5 to about 100, "$n^2$" can be about 20 to about 200, and "$n^3$" can be about 50 to about 300.

The viscosity of the cationic SMI resin can widely vary. For example, the viscosity of the cationic SMI resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the cationic SMI resin can have a viscosity of about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP, at a temperature of about 25° C. In another example, cationic SMI resin can have a viscosity of about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP, at a temperature of about 25° C. In another example, the viscosity of the cationic SMI resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. and a solids content of about 20 wt %.

The viscosity of the various compositions discussed and described herein can be determined using a Brookfield Viscometer at a temperature of about 25° C. For example, a Brookfield Viscometer, Model DV-II+, with a small sample adapter, e.g., a 10 mL sample adapter, and an appropriate spindle, e.g., a number 31 spindle, can be used. The small sample adapter can allow the sample to be cooled and/or heated by a chamber jacket to maintain the temperature of the sample surrounding the spindle at a temperature of about 25° C.

The PAE resin can be or include a reaction product of a mixture of one or more polyamidoamines and one or more epihalohydrins. The polyamidoamine can be a reaction product of a mixture of one or more polyamines and one or more dicarboxylic acid and/or one or more "other" diacids. Illustrative polyamines can include, but are not limited to, dimethylenetriamine, diethylenetriamine, triethylenetetramine, tripropylenetetramine, tetraethylenepentamine, pentaethylenehexamine, aminoethyl piperazine, N-(2-aminoethyl)piperazine, N,N-bis(2-aminoethyl)-ethylenediamine, diaminoethyl triaminoethylamine, piperazinethyl triethylenetetramine, or any mixture thereof. Illustrative dicarboxylic acids can include, but are not limited to, glutaric acid, adipic acid, azelaic acid, malonic acid, suberic acid, sebacic acid, succinic acid, oxalic acid, pimelic acid, 2-methylsuccinic acid, undecanedioic acid, dodecandioic acid, 2-methylglutaric acid, 3,3-dimethylglutaric acid, and acids of tricarboxypentane, such as 4-carboxypimelic acid; alicyclic saturated acids, such as 1,2-cyclohexanedicarboxylic acid, 1-3-cyclohexanedicarboxylic acid, 1,4-cyclohexanedicarboxylic acid, and 1-3-cyclopentanedicarboxylic acid; unsaturated aliphatic acids such as maleic acid, fumaric acid, itaconic acid, citraconic acid, mesaconic acid, aconitic acid, and hexane-3-diotic acid; unsaturated alicyclic acids, such as 1,4-cyclohexenedicarboxylic acid; aromatic acids, such as phthalic acid, isophtalic acid, terephthalic acid, 2,3-naphthalenedicarboxylic acid, benzene-1,4-diacetic acid; and heteroaliphatic acids, such as diglycolic acid, thiodiglycolic acid, dithiodiglycolic acid, iminodiacetic acid, and methyliminodiacetic acid, derivatives thereof, or any mixture thereof. Illustrative epihalohydrins can include, but are not limited to, epichlorohydrin, epibromohydrin, epifluorohydrin, epiiodohydrin, or any mixture thereof. In at least one example, the mixture of the polyamidoamine and the epihalohydrin can include about 0.56 moles to about 1.35 moles of the polyamidoamine and about 0.75 moles to about 1.80 moles of the epihalohydrin. In at least one example, the mixture of the polyamine and the dicarboxylic acid and/or other diacid can include about 0.9 moles to 1.1 moles of the polyamine and about 0.9 moles to about 1.1 moles of the dicarboxylic acid and/or other diacid.

In at least one example, the PAE resin can be prepared by reacting one or more polyamidoamines with one or more epihalohydrins. The polyamidoamine can be prepared by reacting (1) one or more dicarboxylic acids and/or one or more esters of a dicarboxylic acid and (2) one or more polyamines. The polyamidoamine can also be referred to as a "prepolymer." The polyamine can include secondary and/or tertiary amine groups. The dicarboxylic acid can be a saturated aliphatic dibasic carboxylic acid, and can have carbon atoms from about 3 to about 10, and mixtures thereof. For example, dicarboxylic acids having from about 4 to about 8 carbon atoms can be used. Illustrative dicarboxylic acids having from about 4 to about 8 carbon atoms can include, but are not limited to, adipic acid or glutaric acid. Illustrative dicarboxylic acids can also include, but are not limited to, malonic acid, succinic acid, glutaric acid, adipic acid, suberic acid, sebacic acid, or any mixture thereof. Illustrative esters of dicarboxylic acids can include, but are not limited to, dimethyl glutarate, diethyl glutarate, dimethyl adipate, diethyl adipate, or any mixture thereof. Illustrative epihalohydrins can include, but are not limited to, epichlorohydrin, epibromohydrin, epifluorohydrin, epiiodohydrin, or any mixture thereof.

The polyamine reacted with the dicarboxylic acid and/or ester of a dicarboxylic acid to produce the polyamidoamine can include, but is not limited to, one or more compounds having the chemical formula (J).

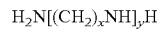

$$H_2N[(CH_2)_xNH]_yH \quad (J).$$

In the chemical formula (J), x and y can be integers independently selected from 2 to about 10. Illustrative polyamines (e.g., polyamine prepolymers) can include, but are not limited to, polyalkylene polyamines. For example, the polyamines can include, but are not limited to, diethylenetriamine (x=2, y=2), triethylenetetramine (x=2, y=3), tripropylenetetramine (x=3, y=3), tetraethylenepentamine (x=2, y=4), and pentaethylenehexamine (x=2, y=5). Other examples of polyamines can include, but are not limited to, methyl bis(3-aminopropyl)-amine, dipropylenetriamine, bis (hexamethylene)triamine, bis-2-hydroxyethyl ethylenediamine, aminoethyl piperazine, N-(2-aminoethyl)piperazine, N,N-bis(2-aminoethyl)-ethylenediamine, diaminoethyl triaminoethylamine, piperazinethyl triethylenetetramine, or the like, or any combinations thereof. The polyamidoamine can include secondary amine groups derived from a polyalkylene polyamine.

The polyamidoamine can be prepared by heating a mixture of the dicarboxylic acid and the polyamine to a temperature of about 110° C. to about 250° C. For example, the mixture of the dicarboxylic acid and the polyamine can be heated to a temperature from about 110° C., about 125° C., or about 140° C. to about 160° C., about 175° C., about 190° C., or about 200° C. In at least one example, the mixture of the dicarboxylic acid and the polyamine can be heated at about atmospheric pressure. In another example, the mixture of the dicarboxylic acid and the polyamine can be heated under a reduced pressure (e.g., below atmospheric pressure).

In carrying out the reaction between the polyamine and the dicarboxylic acid, the amount of the dicarboxylic acid can be sufficient to react substantially completely with the primary amine groups of the polyalkylene polyamine, but insufficient to substantially react with the secondary amine groups of the polyamine. The molar ratio of the polyamine to the dicarboxylic acid can be from about 0.8:1, about 0.85:1, about 0.9:1, about 0.95:1, or about 1:1 to about 1:1, about 1.05:1, about 1.1:1, about 1.2:1, about 1.3:1, or about 1.4:1. For example, the molar ratio of the polyamine to the dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1. In another example, the molar ratio of the polyamine to the dicarboxylic acid can be about 0.9 moles to about 1.1 moles of a polyamine to about 1.1 moles to about 0.9 moles of a dicarboxylic acid.

As discussed above, the mixture of the dicarboxylic acid and the polyamine can be heated under a reduced pressure (e.g., below atmospheric pressure). Heating the mixture of the dicarboxylic acid and the polyamine under a reduced pressure can facilitate a reduction in the reaction temperature. For example, the reaction between the polyamine and the dicarboxylic acid can be performed at a reduced pressure to reduce the reaction temperature to about 75° C. to about 150° C. In at least one example, the reaction time or time of reaction can depend, at least in part, on the temperature and/or pressure, and can generally be from about 0.5 hours to about 4 hours. The reaction between the dicarboxylic acid and the polyamine can proceed to substantial completion. The reaction between the polyamine and the dicarboxylic acid can produce water as a byproduct, which can be removed by distillation. At the end of the reaction, the resulting product can be dissolved or dispersed in water to provide any desired concentration. For example, the resulting product can be dissolved or dispersed in water to provide an aqueous polyamidoamine resin having a solids content of about 40 wt %, about 45 wt %, about 50 wt %, about 55 wt %, or about 60 wt %.

When a diester is used instead of dicarboxylic acid for reaction with the polyamine, the polymerization can be conducted at a lower temperature, such as about 100° C. to about 175° C., and at or below about atmospheric pressure. In this case, the byproduct will be an alcohol, where the type of alcohol can depend upon the identity or type of the diester utilized. For example, utilizing dimethyl ester as the diester can result in a methanol byproduct. In another example, utilizing diethyl ester as the diester can result in an ethanol byproduct. The molar ratio between the polyamine and the diester can be the same as the ratio between the polyamine and the dicarboxylic acid. If the reaction between the polyalkylene polyamine and the diester is carried out under a reduced pressure, the reaction temperature can be reduced, such as at a temperature of about 75° C. to about 150° C.

The amount of the epihalohydrin reacted with the polyamidoamine can be controlled or limited during synthesis of the PAE resin. For example, the molar ratio of the epihalohydrin to the polyamidoamine can be from about 0.75:1, about 0.8:1, about 0.85:1, about 0.9:1, about 0.95:1, or about 1:1 to about 1.2:1, about 1.4:1, about 1.6:1, about 1.8:1, or about 2:1. In another example, the molar ratio of the epihalohydrin to the polyamidoamine can be about 0.55:1 to about 1:1, about 0.75:1 to about 2:1, about 0.9:1 to about 1.1:1, about 1.2:1 to about 1.4:1, about 1.1:1 to about 1.7:1, about 1.4:1 to about 1.9:1, or about 0.95:1 to about 1.7:1. In another example, the molar ratio of the epihalohydrin to the polyamidoamine can be about 0.75 moles to about 1.80 moles epihalohydrin to about 0.56 moles to about 1.35 moles of the polyamidoamine.

The polyamidoamine can be reacted with the epihalohydrin at a temperature from about 0° C., about 10° C., about 20° C., about 25° C., about 30° C., or about 35° C. to about 60° C., about 70° C., about 80° C., about 90° C., or about 100° C. The extent of the reaction between the polyamidoamine and the epihalohydrin can be controlled so that the polyamidoamine is only partially reacted with the epihalohydrin. The reaction can be controlled such that about 25 wt % to about 35 wt % solids solution at 25° C. can have a viscosity of about 350 cP or less, about 300 cP or less, about 250 cP or less, or about 200 cP or less. In another example the reaction can be controlled such that about 25 wt % to about 35 wt % solids solution at 25° C. can have a viscosity of about 125 cP to about 375 cP, about 200 cP to about 300 cP, about 250 cP to about 350 cP, or about 220 cP to about 375 cP.

When the desired viscosity is reached, a sufficient amount of water and/or other liquid medium can be added to adjust the solids content of the PAE resin solution to a desired amount. For example, the PAE resin can have a solids content from about 5 wt %, about 10 wt %, or about 15 wt % to about 20 wt %, about 30 wt %, about 40 wt %, about 60 wt %, about 80 wt %, about 90 wt %, or about 95 wt %. The PAE resin can be cooled to a temperature of about 25° C. In another example, the PAE resin can have a solids content from about 8 wt %, about 10 wt %, about 12 wt %, or about 14 wt % to about 22 wt %, about 25 wt %, about 27 wt %, or about 30 wt %. In at least one example, the PAE resin can be in the form of an aqueous dispersion, suspension, or solution, and can have a solids content of about 20 wt % to about 50 wt %.

The reaction between the polyamidoamine and the epihalohydrin can be performed or carried out in an aqueous solution to moderate or otherwise control the reaction. Although not necessary, the pH can be adjusted to increase or decrease the rate of residual crosslinking.

The polyamidoamine that can be used for producing the PAE resin can have a weight average molecular weight (MW, in Daltons) from about 10,000 to about 100,000. For example, the polyamidoamine can have a weight average molecular weight from about 10,000, about 15,000, about 20,000, about 25,000, or about 30,000 to about 55,000, about 65,000, about 75,000, about 80,000, about 90,000, or about 100,000. In another example, the polyamidoamine can have a weight average molecular weight of about 35,000 to about 55,000, about 35,000 to about 45,000, about 40,000 to about 50,000, about 20,000 to about 65,000, about 30,000 to about 70,000, or about 35,000 to about 50,000.

The ability of the PAE resin to resist gelation can be improved by adding sufficient acid to reduce the pH to about 6 or less, about 5 or less, or about 4 or less. The pH of the PAE resin can be measured, determined, or otherwise estimated when the PAE resin is at a temperature of about 25° C. Any suitable inorganic and/or organic acid can be used to stabilize the product. For example, suitable inorganic and/or organic acids can include, but are not limited to, hydrochloric acid, sulfuric acid, methanesulfonic acid, nitric acid, formic acid, phosphoric acid, and acetic acid. Other compounds that can be used to improve the stability of the PAE resin can include, but are not limited to, urea, aluminum sulfate, or a mixture thereof.

In at least one example, the PAE resin can have a weight average molecular weight (MW, in Daltons) of about 20,000 to about 3,000,000. In some examples, the PAE resin can have a lower weight PAE resin or polymer, a higher weight PAE resin or polymer, or a combination of the lower and the higher weight PAE resins or polymers. The lower weight PAE resin can have a weight average molecular weight of about 20,000 to about 500,000, or about 40,000 to about 200,000. The higher weight PAE resin can have a weight average molecular weight of about 500,000 to about 3,000,000, or about 800,000 to about 1,200,000. In other examples, the weight average molecular weight of the PAE resin can be from about 300,000, about 400,000, about 500,000, about 600,000, about 650,000, or about 700,000 to about 950,000, about 1,000,000, about 1,100,000, about 1,200,000, or about 1,300,000. For example, the weight average molecular weight of the PAE resin can be about 400,000 to about 1,200,000, about 500,000 to about 1,050,000, about 600,000 to about 1,000,000, about 750,000 to about 950,000, about 800,000 to about 850,000, or about 850,000 to about 900,000. In another example, the PAE resin can have a weight average molecular weight of less than 1,300,000, less than 1,200,000, less than 1,100,000, less than 1,000,000, or less than 950,000, and greater than 400,000, greater than 500,000, greater than 600,000, greater than 700,000, or greater than 750,000.

The PAE resin can have a viscosity of about 5 cP, about 50 cP, about 100 cP, or about 200 cP to about 500 cP, about 750 cP, or about 1,000 cP at a temperature of about 25° C. For example, the PAE resin can have a viscosity of about 5 cP to about 50 cP, about 50 cP to about 100 cP, about 80 cP to about 250 cP, about 100 cP to about 150 cP, about 150 cP to about 200 cP, about 200 cP to about 250 cP, about 250 cP to about 350 cP, or about 350 cP to about 1,000 cP at a temperature of about 25° C. In another example, the PAE resin can have a viscosity of about 5 cP, about 50 cP, about 100 cP, or about 200 cP to about 500 cP, about 750 cP, or about 1,000 cP at a temperature of about 25° C. and a solids content of about 25 wt % to about 35 wt %.

The PAE resin can have a pH from about 2.5, about 3, about 3.5, or about 4 to about 4.5, about 5, about 5.5, about 6, about 6.5, about 7, or about 8 when at a temperature of about 25° C. For example, the pH of the PAE resin can be about 2 to about 5, about 2.5 to about 3.5, about 3 to about 4.5, about 4 to about 6, or about 2.5 to about 5.5 when at a temperature of about 25° C. In another example, the PAE resin can have a pH of about 2.5, about 3, about 3.5, or about 4 to about 4.5, about 5, about 5.5, about 6, about 6.5, about 7, or about 8 when at a solids content of about 25 wt % to about 35 wt % and at a temperature of about 25° C.

The PAE resin can have a charge density of about 1.5 mEq/g to about 4 mEq/g of solids. For example, the PAE resin can have a charge density from about 1.5 mEq/g of solids, 1.7 mEq/g of solids, about 1.8 mEq/g of solids, about 1.85 mEq/g of solids, about 1.9 mEq/g of solids, about 1.95 mEq/g of solids, or about 2 mEq/g of solids to about 2.2 mEq/g of solids, about 2.3 mEq/g of solids, about 2.4 mEq/g of solids, about 2.5 mEq/g of solids, about 2.6 mEq/g of solids, about 2.7 mEq/g of solids, or about 3 mEq/g of solids, as measured by streaming electrode potential using a Mütek PCD titrator. For example, the PAE resin can have a charge density of about 1.5 mEq/g of solids to about 1.7 mEq/g of solids, about 1.5 mEq/g of solids to about 3 mEq/g of solids, about 1.9 mEq/g of solids to about 2.5 mEq/g of solids, about 2 mEq/g of solids to about 2.8 mEq/g of solids, about 1.7 mEq/g of solids to about 2.4 mEq/g of solids, about 2.5 mEq/g of solids to about 3 mEq/g of solids, about 2.25 mEq/g to about 3.5 mEq/g of solids, about 2.3 mEq/g to about 3.35 mEq/g of solids, or about 2.4 mEq/g to about 3.2 mEq/g of solids, as measured via the streaming electrode potential using the Mütek PCD 0.3 titrator.

The PAE resin can also have a ratio of azetidinium ions to amide residues (which can be abbreviated by "Azet ratio" or "an azetidinium ion ratio") of about 0.4 to about 1.3. For example, the azetidinium ion ratio can also be about 0.5 to about 1.15, about 0.6 to about 1, or about 0.7 to about 0.9. In some examples, the ratio of azetidinium ions to secondary amine moieties in the resin can be about 0.4 to about 1. In other examples, the PAE resin can have an azetidinium ion ratio from about 0.5, about 0.55, about 0.6, or about 0.65 to about 0.7, about 0.75, about 0.8, about 0.85, or about 0.9. For example, the PAE resin can have an azetidinium ion ratio of about 0.55 to about 0.8, about 0.65 to about 0.8, about 0.55 to about 0.7, or about 0.6 to about 0.7. The azetidinium ion ratio can be measured by quantitative $^{13}$C-NMR as a ratio of the 2 methylene carbon atoms of the azetidinium ion ring to the 2 interior methylene carbon atoms of the adipic acid residue in the polymer backbone. In some examples, the PAE resin can have an azetidinium ion ratio of about 0.55 to about 0.8.

In other examples, the PAE resin can be formed by separating the synthesis process into one or more discrete steps. For example, a first reaction step can include the reaction of the polyamine prepolymer with one or more cross-linkers, and a second reaction step can include the reaction of an intermediate cross-linked prepolymer with the epichlorohydrin. The second reaction step can utilize less epichlorohydrin than conventional methods to reach the desired end-point. Further, the second reaction step can be affected under reaction conditions that favor optimized azetidinium group formation over further cross-linking. The asymmetric functionality of epichlorohydrin can be useful in this functionalization to allow a relatively *facile* reaction of the epoxy group with secondary amines to form a pendant chlorohydrin moiety, followed by an intramolecular cyclization of the pendant chlorohydrin to generate a cationic azetidinium functionality. The intramolecular cyclization can utilize heating of the halohydrin-functionalized polymer.

In at least one example, the second reaction step can be carried out using any epihalohydrin, including, but not limited to, epichlorohydrin, epibromohydrin, and epiiodohydrin, or any combination thereof. It should be appreciated that, when epihalohydrin or epichlorohydrin is recited in this disclosure, such as in formulas, structures, or reaction schemes, any one or any combination of the epihalohydrins can be used in the process.

By way of example, using the partially cross-linked polyamidoamine prepolymer derived from adipic acid and DETA (diethylenetriamine), and cross-linking using methylene-bis-acrylamide (MBA), the epichlorohydrin functionalization product can be illustrated by the chemical formula (K), termed a halohydrin-functionalized polymer or a chlorohydrin-functionalized polymer:

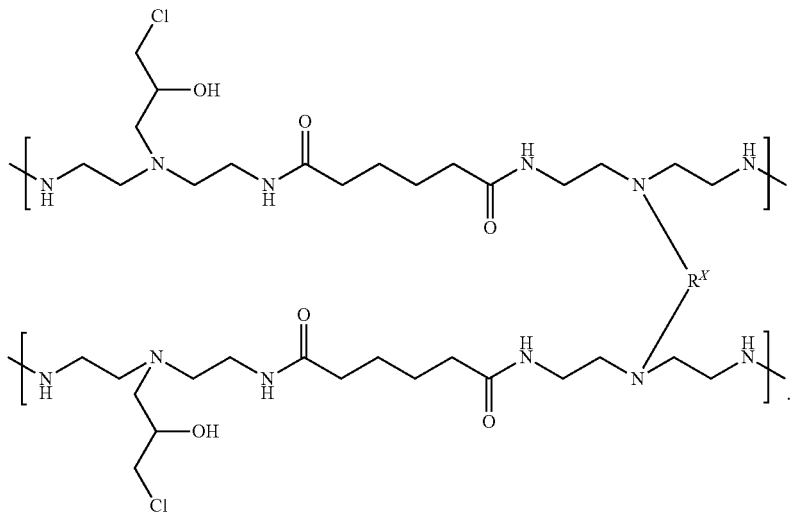

(K)

It should be appreciated that the epichlorohydrin functionalization product illustrated by the chemical formula (K) does not reflect the use of any mono-functional modifiers in addition to the symmetrical cross-linker. In the epichlorohydrin functionalization product illustrated by the chemical formula (K), "$R^x$" can represent the cross-linker.

The reaction of epihalohydrins such as epichlorohydrin can generally be tailored to consume a high percentage of or the remaining secondary amine moieties in generating the halohydrin-functionalized polymer, in this case, a chlorohydrin-functionalized polymer.

The formation of the halohydrin-functionalized polymer can be carried out using a range of epichlorohydrin molar ratios. In at least one example, the formation of the halohydrin-functionalized polymer can be carried out with an excess of epichlorohydrin. The stoichiometric reaction of epichlorohydrin with a secondary amine group can have a 1:1 molar ratio of the epichlorohydrin to the secondary amine. In some examples of the reaction of epichlorohydrin with the secondary amine group, the moles of epichlorohydrin per one mole of the secondary amine group can be about 0.8 moles to about 3 moles, about 0.9 moles to about 2.5 moles, about 1 mole to about 2 moles, about 1.1 moles to about 1.7 moles, about 1.2 moles to about 1.5 moles, or about 1.25 moles to about 1.45 moles. In other examples of the reaction of epichlorohydrin with the secondary amine group, the moles of epichlorohydrin per one mole of the secondary amine group can be about 0.8, about 0.9, about 1, about 1.1, about 1.2, about 1.3, about 1.4, about 1.5, or about 1.6.

A further aspect of the process can be that sufficient amounts of a symmetric cross-linker and epihalohydrin can be employed such that the PAE resin can include substantially no secondary amine groups. This result can be affected by using the molar amounts and ratios disclosed herein, but the PAE resins can include substantially no secondary amine groups even when molar amounts and ratios outside those recited are used. By substantially no secondary amine groups, it is intended that less than 10% of the original secondary amines in the starting PAE resin prior to its cross-linking, functionalization, and cationization remain. Alternatively, less than 5%; alternatively, less than 2%; alternatively, less than 1%; alternatively, less than 0.5%; alternatively, less than 0.2%; alternatively, less than 0.1%; alternatively, less than 0.01%; alternatively, less than 0.005%; or alternatively, less than 0.001% of the original secondary amines in the starting PAE resin remain.

The halohydrin-functionalized polymer or resin (e.g., chlorohydrin-functionalized polymer) can be converted to the resin composition by subjecting it to cyclization conditions to form azetidinium ions. The cyclization conditions can include heating the chlorohydrin-functionalized polymer. In contrast to the conventional method where heating can induce both cross-linking and cyclization, the cross-linking portion of this process can be completed when or before the cyclization can be carried out, thereby affording greater process control and the ability to more closely tailor the desired properties of the resulting resin. Also in contrast to the conventional method, the process of this disclosure reduces and/or minimizes the formation of the epichlorohydrin byproducts, such as 1,3-dichloro-2-propanol (1,3-DCP or "DCP") and 3-chloropropane-1,2-diol (3-CPD or "CPD").

According to one aspect of the disclosure, the concentration of epichlorohydrin 1,3-dichloro-2-propanol (1,3-DCP) remaining in the PAE resin at 25 wt % solids (DCP at 25%) can be about 15,000 ppm or less, about 14,000 ppm or less, about 13,000 ppm or less, about 12,000 ppm or less, about 11,500 ppm or less, about 11,000 ppm or less, about 10,500 ppm or less, about 10,000 ppm or less, about 8,000 ppm or less, about 6,000 ppm or less, or about 5,000 ppm or less.

The chlorohydrin-functionalized polymer having the chemical formula (K) can be used to form a quaternary nitrogen-based resin ("cationization") having the chemical formula (L), which has been subjected to conditions sufficient to intramolecularly cyclize the pendant chlorohydrin to impart azetidinium functionality:

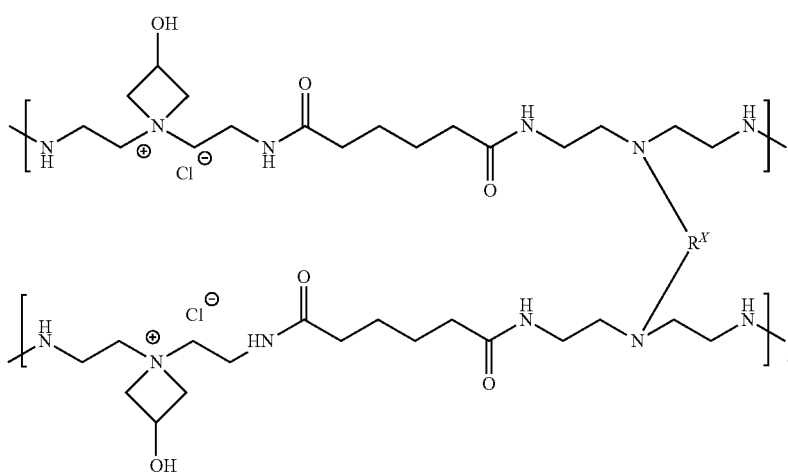

(L)

In the process of forming the PAE resin, the PAE resin can be generated by subjecting the halohydrin-functionalized polymer to cyclization conditions sufficient to convert the halohydrin groups to form azetidinium ions. In at least one example, at least a portion of the halohydrin groups can be cyclized to form azetidinium ions. According to another aspect, at least 90% of the halohydrin groups can be cyclized to form azetidinium ions. Alternatively, at least 95%; alternatively, at least 97%; alternatively, at least 98%; alternatively, at least 98.5%; alternatively, at least 99%; alternatively, at least 99.5%; alternatively, at least 99.7%; alternatively, at least 99.8%; or alternatively, at least 99.9% of the halohydrin groups are cyclized to form azetidinium ions.

Additional steps in the PAE resin processing can be used, for example, to adjust the solids content of the PAE resin, beyond those discussed and described above or elsewhere herein. For example, the resin can be generated by converting the halohydrin-functionalized polymer to an azetidinium functionalized polymer. Following this step, the pH of the PAE resin can be adjusted such that the PAE resin can have a pH of about 2 to about 4.5, about 2.2 to about 4.2, about 2.4 to about 4, about 2.7 to about 3.7, such as, for example, about 3.3. This pH adjustment step can also be followed by the step of adjusting the solids content of the composition to form the PAE resin. The solids content of the PAE resin can be about 10% to about 50%, about 15% to about 40%, or about 20% to about 30%, such as, for example, about 25%.

The PAE resin can have a weight average molecular weight of about 20,000 to about 3,000,000, about 50,000 to about 2,500,000, about 100,000 to about 2,000,000, about 50,000 to about 1,500,000, about 100,000 to about 1,000,000. For example, the PAE resin can have a weight average molecular weight of about 50,000 to about 1,700,000. In other examples, the PAE resin can have a weight average molecular weight of about 600,000 to about 1,600,000, about 700,000 to about 1,500,000, about 800,000 to about 1,300,000, or about 900,000 to about 1,100,000.

The PAE resin can have an azetidinium equivalent weight, defined as the degree of polymerization multiplied by the Azet ratio, or (degree of polymerization)×(Azet), of about 1,600 to about 3,800. Alternatively, the azetidinium equivalent weight can be about 1,800 to about 3,500 or from about 2,000 to about 2,900.

Suitable methods for preparing the PAE resin can include those discussed and described in U.S. Pat. Nos. 2,926,116; 3,058,873; 3,772,076; and 5,338,807; U.S. Patent Application Publication Nos.: 2012/0064323 and 2014/0020858; EP Patent No.: EP 0488767; Canadian Patent Application Publication No.: CA 979,579; and GB Publication No.: GB 865,727(A).

Many commercially available PAE resin are known and can be used to make the resin compositions discussed and described herein. Suitable commercially available PAE resins can include, but are not limited to, AMRES resins available from Georgia-Pacific Chemicals LLC, KYMENE® resins available from Ashland-Hercules, and FENNOSTRENGTH® resins available from Kemira.

In at least one example, one or more of the UF resins contained in the resin composition can be an anionic UF resin, a cationic UF resin, or a mixture thereof. The UF resin can be prepared from one or more urea monomers and one or more formaldehyde monomers, and/or from one or more UF precondensates in a manner or process known to those having ordinary skill in the art. For example, the process of preparing the UF resin from the urea and formaldehyde monomers can include, but is not limited to, staged monomer addition, staged catalyst addition, pH control, amine modification, and the like. In another example, the urea and formaldehyde monomers can be reacted with one another in an aqueous solution under alkaline conditions using known techniques to form the UF resin.

The formaldehyde utilized to prepare the UF resin can be provided in many forms. For example, the formaldehyde can be provided as an aqueous solution (e.g., formalin). Formalin can contain from about 37% to about 50% by weight of formaldehyde. Other forms of formaldehyde, including, but not limited to, paraformaldehyde, can also be used. In at least one example, other suitable aldehydes can be used in addition to or in substitution of formaldehyde. For example, the other suitable aldehydes can include, but are not limited to, aliphatic aldehydes (e.g., acetaldehyde and propionaldehyde), aromatic aldehydes (e.g., benzylaldehyde and furfural), glyoxal, crotonaldehyde, or any combination or mixture thereof.

In at least one example, other aldehyde monomers can be used in lieu of or in combination with formaldehyde for making the UF resin. The aldehyde monomers can include any suitable aldehyde or combination of aldehydes. The aldehyde monomers can include a variety of substituted and unsubstituted aldehyde compounds. Illustrative aldehyde compounds can include the so-called masked aldehydes or aldehyde equivalents, such as acetals or hemiacetals. Illustrative aldehyde compounds can also include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. In at least one example, the aldehyde monomer can be formaldehyde.

The urea utilized to prepare the UF resin can be in many forms. For example, the urea can be provided as a solid (e.g., prill) and/or a liquid/solution (e.g., aqueous solution). It may be appreciated that any form of urea or urea in combination with formaldehyde can be utilized to prepare the UF resin. Both urea prill and combined urea-formaldehyde products can be preferred, such as Urea-Formaldehyde Concentrate or UFC 85. These types of products can be as discussed and described in U.S. Pat. Nos. 5,362,842 and 5,389,716.

The UF resin can be prepared using a molar excess of formaldehyde. When synthesized, such resins can contain a relatively low level of residual "free" urea and a relatively high level of residual "free" (i.e., unreacted) formaldehyde. Prior to any formaldehyde scavenging, the UF resin can be characterized by a free formaldehyde content of about 0.2 wt % to about 18 wt % of the aqueous UF resin. For example, the UF resin can have a concentration of free formaldehyde of about 0.1 wt %, about 0.5 wt %, about 1 wt %, or about 2 wt % to about 6 wt %, about 12 wt %, or about 18 wt %, based on the total weight of the UF resin.

The UF resin can have a molar ratio of formaldehyde to urea (F:U) of about 0.3:1, about 0.9:1, about 1.5:1, or about 2:1 to about 3:1, about 4:1, about 5:1, or about 6:1. For example, the UF resin can have a molar ratio of formaldehyde to urea of about 0.5:1 to about 1.2:1, about 1.3:1 to about 2:1, about 2:1 to about 3:1, about 1.1:1 to about 3:1, about 4:1 to about 5:1, or about 5:1 to about 6:1. In other example, the UF resin can have a molar ratio of formaldehyde to urea of about 0.7:1 to about 2.7:1, about 0.9:1 to about 1.3:1, about 1:1 to about 2.4:1, about 1.1:1 to about 2.6:1, or about 1.3:1 to about 2:1. In another example, the UF resin can have a molar ratio of formaldehyde to urea of about 0.25:2.5 to about 1.5:2.5.

The UF resin can have a weight average molecular weight of about 200, about 300, or about 400 to about 1,000, about 2,000, about 14,000, about 25,000, about 50,000, about 100,000 or about 500,000. For example, the UF resin can have a weight average molecular weight of about 250 to about 450, about 450 to about 550, about 550 to about 950, about 950 to about 1,500, about 1,500 to about 2,500, or about 2,500 to about 6,000. In another example, the UF resin can have a weight average molecular weight of about 175 to about 800, about 700 to about 3,330, about 1,100 to about 4,200, about 230 to about 550, about 425 to about 875, or about 475 to about 775. In other examples, the UF resin can have a weight average molecular weight of about 10,000 to about 100,000, about 12,000 to about 250,000, or about 14,000 to about 500,000.

In at least one example, the reaction between the urea and the formaldehyde can be carried out in an aqueous solution. The reaction can be conducted such that the resulting UF resin can have a solids content of at least about 20 wt %, at least about 30 wt %, at least about 35 wt %, or at least about 45 wt %, based on the weight of the UF resin solution. The solids content can be from about 20 wt %, about 30 wt %, about 40 wt %, about 45 wt %, or about 50 wt % to about 55 wt %, about 60 wt %, about 65 wt %, about 70 wt %, about 75 wt %, or about 80 wt %, based on the weight of the UF resin solution. For example, the UF resin solution can have a non-volatile material or solids content of about 40 wt % to about 48 wt %, about 40 wt % to about 44 wt %, about 45 wt % to about 65 wt %, or about 50 wt % to about 60 wt %, based on the weight of the UF resin solution.

The viscosity of the UF resin can widely vary. For example, the viscosity of the UF resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the urea-formaldehyde resin can have a viscosity of about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP, at a temperature of about 25° C. In another example, the urea-formaldehyde resin can have a viscosity of about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP, at a temperature of about 25° C. In another example, the viscosity of the UF resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. and a solids content of about 25 wt %. The viscosity can be determined using a Brookfield viscometer. For example, the Brookfield Viscometer can be equipped with a small sample adapter, such as a 10 mL adapter, and an appropriate spindle (e.g., spindle No. 31) to maximize torque.

The UF resin can have pH of about 1, about 2, about 3, about 4, about 5, about 6, or about 7 to about 8, about 9, about 10, about 11, about 12, or about 13. In another example, the UF resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13 at a temperature of about 25° C. In another example, the UF resin can have a pH of about 1, about 2, about 3, about 4, about 5, about 6, or about 7 to about 8, about 9, about 10, about 11, about 12, or about 13 at a temperature of about 25° C. and a solids content of about 25 wt %.

In at least one example, the UF resin can include one or more additives. Illustrative additives can include, but are not limited to, ammonia, alkanolamines, polyamines, such as an alkyl primary diamine (e.g., ethylenediamine), or any mixture thereof. Other additives, such as melamine, ethylene ureas, and primary, secondary, and tertiary amines, for example, dicyanodiamide, can also be incorporated into the UF resin. The concentration of one or more of the additives in the reaction mixture can be from about 0.05 wt % to about 20 wt %, based on a total weight of the UF resin solids. The additives can promote hydrolysis resistance, polymer flexibility, and/or reduce formaldehyde emission from the cured resin. In at least one example, the additives can include additional urea or urea additions. The urea additions can be provided as a scavenger for formaldehyde and/or as a diluent. The UF resin can have a water dilutability of about 1:1 to about 100:1. For example, the UF resin can have a water dilutability of about 5:1 or greater.

In at least one example, the additive can be or include other monomers and/or polymers. Illustrative monomer and/ or polymer additives can include, but are not limited to, styrene acrylic acid or styrene acrylate, an adduct of styrene, maleic anhydride, and an acrylic acid or acrylate, or a mixture of a styrene acrylic acid or styrene-acrylate copolymer and a styrene-maleic anhydride copolymer. In at least one example, the additive can be added to the UF resin. In another example, the additives can be formed in situ, for example, by mixing the styrene-maleic anhydride and an acrylate monomer with the UF resin.

The additive can be prepared by combining styrene, maleic anhydride, and an acrylate or acrylic acid in appropriate or sufficient amounts to form a terpolymer. The amount of styrene can be about 50% to about 85%. For example, the amount of the styrene can be about 70%. The amount of maleic anhydride can be about 15% to about 50%. For example, the amount of the maleic anhydride can be about 25%. The amount of the acrylate or acrylic acid can be about 1% to about 20%. For example, the amount of the acrylate can be about 5%.

The constituents of the terpolymer can be dissolved in a suitable solution. A suitable solution for the constituents of the terpolymer can include an aqueous solution of sodium hydroxide, ammonium hydroxide, potassium hydroxide, or any combination or mixture thereof. In one or more examples, about 1-5% of the terpolymer constituents can be dissolved in the aqueous solution. The aqueous solution can be heated from about 70° C. to about 90° C., and held until the terpolymer is in solution. The aqueous solution containing the terpolymer constituents can be added to the UF resin or the UF resin can be added to the aqueous solution containing the terpolymer constituents.

Alternatively, the acrylic acid or acrylate can be reacted with styrene maleic anhydride in situ with the UF resin. The result can be a styrene maleic anhydride methylmethacrylate terpolymer. Any suitable acrylic acid or acrylate can be used. Illustrative acrylic acids or acrylates can include, but are not limited to, methyl methacrylate, butyl acrylate, methacrylate, or combinations thereof. In at least one example, the acrylate is methyl methacrylate (MMA). In another example, one or more styrene-maleic anhydride (SMA) copolymers can be used. Suitable SMA copolymers can be as discussed and described in U.S. Pat. No. 5,914,365.

The additives can be present in an amount of about 0.1 wt % to about 10 wt %, based on the total weight of the undiluted UF resin solids. For example, the additives can make up about 0.5 wt % of the undiluted UF resin solids. The total concentration of non-volatile materials in the aqueous UF resin composition (predominantly the UF resin and the additive solids) can vary widely. For example, the total solids concentration can be from about 5 wt %, about 8 wt %, about 10 wt %, about 13 wt %, or about 15 wt % to about 20 wt %, about 25 wt %, about 30 wt %, about 35 wt %, or about 40 wt %, based on the total weight of the UF resin composition. In another example, the total solids concentration can be from about 20 wt % to about 35 wt %, based on the total weight of the UF resin composition. In yet another example, the total solids concentration can be from about 20 wt % to about 30 wt %, based on the total weight of the UF resin composition.

The UF resin can be or include commercially available resins. In at least one example, the UF resin can be or include those discussed and described in U.S. Pat. No. 5,362,842. In another example, the UF resin can be or include those sold by Georgia Pacific Chemicals LLC (e.g. GP® 2928 and GP® 2980).

The resin composition can be used to make a wide variety of fiber products. The resin compositions can be used in the manufacture of paper as aqueous solutions and/or dispersions. Generally, the resin composition when used as a paper strengthening agent can have a solids concentration of about 5 wt %, about 10 wt %, about 15 wt %, or about 20 wt % to about 30 wt %, about 35 wt %, about 40 wt %, about 45 wt %, or about 50 wt %. For example, the resin composition can have a solids content of about 10 wt % to about 40 wt %, about 15 wt % to about 35 wt %, about 20 wt % to about 30 wt %, about 20 wt % to about 25 wt %, about 23 wt % to about 27 wt %, about 25 wt % to about 30 wt %, about 25 wt % to about 35 wt %, or about 30 wt % to about 40 wt %.

The resin composition can be mixed, blended, sprayed, brushed, soaked, or otherwise contacted with fibers, fiber pulps, fiber sheets, formed fiber structures such as paper, and the like to produce fiber products. Illustrative types of fiber sheets can include, but are not limited to, kraft paper, sulfite paper, semi-chemical paper, and the like, including paper produced using both bleached and unbleached pulps. Particular fiber products can include, but are not limited to, facial tissue, napkins, paper towels, paper plates, paper bowls. paper cups, carrierboard, liquid packaging, bag paper, wrapping paper, bathroom tissue, newspaper, notebook paper, linerboard medium, and other specialty papers.

The resin composition can be added at any time before, during, and/or after the paper is formed. In one example, the resin composition can be added at the wet end of a papermaking facility to the dilute cellulose fiber suspensions, normally at a point when wet strength resins are conventionally added. In another example, the resin composition can be added to a previously prepared paper by padding, spraying, immersing, printing, brushing, soaking, dip coating, and the like.

In at least one example, a method for making strengthened fiber or paper products can include combining fibers (e.g., cellulosic fibers, synthetic fibers, inorganic fibers, and/or other types of fibers), at least one PAE resin, at least one cationic SMI resin, and at least one UF resin to form or produce a mixture, which can be referred to as a fiber mixture. The PAE resin, the cationic SMI resin, and the UF resin can be added to an aqueous suspension containing the fibers in any order. For example, the PAE resin, the cationic SMI resin, and the UF resin can be added sequentially or simultaneously with respect to one another. In at least one example, the method can include adding the PAE resin to an aqueous suspension containing fibers, and subsequently adding the cationic SMI resin and the UF resin to the aqueous suspension (e.g., sequentially or simultaneously) to form or produce the fiber mixture containing the fibers, the PAE resin, the cationic SMI resin, and the UF resin. For example, the PAE resin can be added to the aqueous suspension containing fibers first, and after the addition of the PAE resin, the cationic SMI resin and the UF resin can be added to the aqueous suspension, either sequentially or simultaneously, to form or produce the fiber mixture. In another example, the method can include adding a cationic SMI resin to an aqueous suspension containing fibers, and subsequently adding a PAE resin and a UF resin to the aqueous suspension (i.e., sequentially or simultaneously) to form or produce the fiber mixture containing the fibers, the PAE resin, the cationic SMI resin, and the UF resin. In yet another example, the method can include adding a UF resin to an aqueous suspension containing fibers, and subsequently adding a PAE resin and a cationic SMI resin to the aqueous suspension (i.e., sequentially or simultaneously) to form or produce the fiber mixture containing the fibers, the PAE resin, the cationic SMI resin, and the UF resin. In another example, the method can include combining a cationic SMI resin, a PAE resin, and a UF resin with one another to form a resin mixture, and subsequently combining the fibers with the resin mixture to form or produce the fiber mixture containing the fibers, the PAE resin, and the cationic SMI resin.

In at least one example, the fiber mixture can contain the fibers, the PAE resin, the cationic SMI resin, the UF resin, as well as any of the precursors of the mixture, including aqueous suspensions or mixtures that contain the fibers, the PAE resin, the cationic SMI resin, the UF resin, water, or any combination thereof. The fiber mixture containing the fibers, the PAE resin, the cationic SMI resin, the UF resin, and/or any of the precursors of the fiber mixture can be conditioned for a predetermined period of time during and between the steps of combining the components thereof. The fiber mixture can be conditioned upon the addition of the fibers, the PAE resin, the cationic SMI resin, and/or the UF resin to facilitate contact between the components of the mixture. Conditioning can include, but is not limited to, agitating the fiber mixture(s) for a predetermined period of time prior to subjecting the fiber mixture to one or more separation processes. For example, the fiber mixtures containing the fibers, the PAE resin, the cationic SMI resin, and/or the UF resin, can be stirred, blended, mixed, or otherwise agitated for a time from about 30 seconds, about 1 minute, about 2 minutes, about 3 minutes, or about 4 minutes to about 5 minutes, about 10 minutes, about 15 minutes, about 20 minutes, about 30 minutes, about 1 hour, or about 24 hours. Conditioning the fiber mixtures can also include heating and/or cooling the fiber mixtures to a temperature from about 1° C., about 20° C., or about 35° C. to about 60° C., about 80° C., or about 95° C.

Conditioning the mixture can also include adjusting the pH of any of the mixtures containing the fibers, the PAE resin, the cationic SMI resin, and/or the UF resin. The pH of the mixtures can be from about 2, about 3, about 4, or about 5 to about 8, about 9, about 10, about 11, or about 12 when at a temperature of about 25° C. For example, the pH of the mixtures can be about 2 to about 12, about 4 to about 10, or about 6 to about 8, for example, about 7 when at a temperature of about 25° C. Any one or more acid compounds and/or base compounds can be combined with the mixtures to adjust the pH thereof.

Illustrative acid compounds that can be used to adjust the pH value of any of the mixtures containing the fibers, the PAE resin, the cationic SMI resin, and/or the UF resin can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bisulfate, sodium metabisulfite, or any combination thereof.

Illustrative base compounds that can be used to adjust the pH value of any of the mixtures containing the fibers, the PAE resin, the cationic SMI resin, and/or the UF resin can include, but are not limited to, hydroxides, carbonates, ammonia, amines, or any combination or mixture thereof. Illustrative hydroxides can include, but are not limited to, sodium hydroxide, potassium hydroxide, ammonium hydroxide (e.g., aqueous ammonia), lithium hydroxide, cesium hydroxide, or any combination or mixture thereof. Illustrative carbonates can include, but are not limited to, sodium carbonate, sodium bicarbonate, potassium carbonate, ammonium carbonate, or any combination or mixture thereof. Illustrative amines can include, but are not limited to, trimethylamine, triethylamine, triethanolamine, diisopropylethylamine (Hunig's base), pyridine, 4-dimethylaminopyridine (DMAP), 1,4-diazabicyclo[2.2.2]octane (DABCO), or any combination or mixture thereof.

In at least one example, a fiber web (e.g., cellulosic fiber web) and/or the fibers (e.g., cellulosic fibers) can include at least one material selected from bleached furnish, softwood, hardwood, paper pulp, mechanical pulp, or any mixture thereof. The fiber web can be woven, non-woven, or a combination thereof. The terms "cellulosic," "cellulosic sheet," "cellulosic fiber," "cellulosic fiber web," "fiber," "fiber web," and the like, are meant to include any product incorporating papermaking fibers having cellulose as a major constituent. "Papermaking fibers" can include virgin pulps, recycled (e.g., secondary) cellulosic fibers, or fiber mixtures containing virgin cellulosic fibers and/or reconstituted cellulosic fibers. Fibers suitable for making the cellulosic fiber webs, fibrous sheets, paper products, and paper sheets of the examples described herein can include: non-wood fibers, such as cotton fibers or cotton derivatives, abaca, kenaf, sabai grass, flax, esparto grass, straw, jute hemp, bagasse, milkweed floss fibers, and pineapple leaf fibers; and wood fibers, such as those obtained from deciduous and coniferous trees, including softwood fibers, such as Northern and Southern softwood Kraft fibers; hardwood fibers, such as eucalyptus, maple, birch, aspen, as well as a mixture or combination of softwoods and hardwoods, for example, a bleached furnish (60% hardwood and 40% softwood, by weight). Papermaking fibers used in connection with the examples described herein can include naturally-occurring, pulp-derived fibers as well as reconstituted cellulosic fibers, such as lyocell or rayon. Papermaking fibers can be liberated from their source material by any one of a number of chemical pulping processes familiar to one experienced in the art, including: sulfate, sulfite, polysulfide, soda pulping, as well as other processes. The pulp can be bleached by chemical means including, but not limited to, the use of chlorine, chlorine dioxide, oxygen, ozone, hydrogen peroxide, alkaline peroxide, rear earth peroxides, as well as other compounds. Naturally-occurring, pulp-derived fibers are referred to herein simply as "pulp-derived" papermaking fibers. The fiber or paper products described herein can include a blend of conventional fibers, whether derived from virgin pulp or recycled sources, and high coarseness lignin-rich tubular fibers, such as bleached chemical thermomechanical pulp (BCTMP). Pulp-derived fibers can also include high yield fibers such as BCTMP and thermomechanical pulp (TMP), chemithermomechanical pulp (CTMP), and alkaline peroxide mechanical pulp (APMP). Recycled fibers can be relatively shorter, stiffer, curlier, and more brittle than virgin fibers. Dewatering tests can assess fines content and the degree of external fibrillation. The dewatering tests can measure how easily water drains from the papermaking pulp. The Schopper-Riegler (SR) number or Canadian Standard Freeness (CSF) are the most common dewatering tests. The SR number can increase with beating and fines content, and the CSF can decrease with beating and fines content.

In at least one example, the PAE resin can include a reaction product of a polyamidoamine and an epihalohydrin, and the cationic SMI resin can include a reaction product of a SMA copolymer and an amine compound. The cationic SMI resin can have one or more of the chemical formulas (A)-(H), as well as derivatives thereof. In some examples, the cationic SMI resin can have a weight average molecular weight of about 3,000 to about 200,000 and a styrene to maleimide molar ratio of about 1:1 to about 5:1.

One or more fiber sheets (e.g., cellulosic fiber sheets) can be formed from the fiber mixture (e.g., cellulosic fiber mixture) and the fiber sheet can be contacted with the resin composition so that the fiber sheets includes at least the fibers, the PAE resin, the cationic SMI resin, and the UF resin. In another example, the fibers (e.g., cellulosic fibers) can be contacted with the resin composition to form a fiber and resin mixture and the fiber sheet can be formed from the fiber and resin mixture. The resin composition in the formed fiber sheet can be at least partially cured to produce a strengthened fiber product.

In some examples, the fiber sheets can be formed by passing the fiber mixture through a sheet former, applying pressure to the fiber sheets, and drying the fiber sheets. For example, the fiber sheets can be formed from a fiber mixture formed or produced by a Noble & Wood® sheet former. The fiber sheets can be pressed with at least one blotter, but generally between two blotters subsequent to being formed by the sheet former. The fiber sheets can be pressed at a pressure of about 34.53 Pa to about 344.8 kPa, about 68.93 Pa to about 206.8 kPa, or about 103.5 kPa to about 172.9 kPa. For example, the fiber sheets can be pressed at a pressure of about 137.9 kPa. Also, the fiber sheets can be pressed for about 5 seconds to about 1 minute, or longer depending on the desired product.

The fiber sheets can be dried by heating the fiber sheets at a drying temperature with a sheet dryer. For example, the fiber sheets can be dried on an Adirondack dryer with one pass or multiple passes of the fiber sheets. The dryer can be a belt-driven and fabric-covered dryer. The drying temperature can be about 50° C. to about 200° C., about 100° C. to about 150° C., or about 110° C. to about 140° C. For example, the drying temperature can be about 115° C. or about 130° C. Generally, the fiber sheets can be dried for about 20 seconds to about 3 minutes.

In at least one example, the resin composition that includes the mixture of the PAE resin, the cationic SMI resin, and the UF resin in the fiber sheet can be at least partially cured at a predetermined temperature for a predetermined time to produce the strengthened fiber product. In one example, the fiber sheets can be cured in a forced-air, convection oven. The curing temperature can be about 80° C. to about 120° C., about 90° C. to about 115° C., or about 100° C. to about 110° C. to form the strengthened fiber product. For example, the curing temperature can be about 105° C. to form the strengthened fiber product. Also, the curing time can be about 2 minutes to about 20 minutes, about 2 minutes to about 10 minutes, or about 3 minutes to about 8 minutes. For example, the curing time can be about 5 minutes. In some examples, the fiber sheets can be cured at a curing temperature of about 90° C. to about 115° C., and for a curing time of about 3 minutes to about 10 minutes to form the strengthened fiber product.

In another example, prior to at least partially curing the resin composition, the resin composition, based on a solids content thereof and containing the PAE resin, the cationic SMI resin, and the UF resin, can be present in the strengthened fiber product in an amount of about 0.05 wt % to about 5 wt %, based on a dried weight of the fiber sheet.

The method can further include monitoring and/or adjusting the pH value of the aqueous suspension to be about 6 to about 8 prior to adding the PAE resin into the aqueous suspension. In some examples, the cationic SMI resin and/or the UF resin can be added to the aqueous suspension about 20 seconds to about 5 minutes after the addition of the PAE resin to the aqueous suspension.

The resin composition can be present in the strengthened fiber product, e.g., a paper product, in an amount of about 0.01 wt %, about 0.05 wt %, about 0.1 wt %, about 0.3 wt %, or about 0.5 wt % to about 1 wt %, about 2 wt %, about 3 wt %, about 4 wt %, or about 5 wt %, based on a dried weight of the strengthened fiber or paper product. For example, the resin composition can be present in the strengthened fiber product in an amount of about 0.05 wt % to about 5 wt %, about 0.1 wt % to about 2 wt %, about 0.2 wt % to about 1.8 wt %, or about 0.3 wt % to about 1.2 wt %, based on a dried weight of the strengthened fiber product. For example, the resin composition can be present in the strengthened fiber or the paper product in an amount of about 0.6 wt %, based on a dried weight of the strengthened fiber product. In another example, the resin composition can be present in the strengthened fiber or the paper product in an amount of about 0.4 wt % to about 0.8 wt % or about 0.5 wt % to about 0.7 wt %, based on a dried weight of the strengthened fiber product.

The resin composition and/or the strengthened fiber product can include the PAE resin, the cationic SMI resin, and the UF resin at varying weight ratios. For example, the resin composition and/or the strengthened fiber product can have a PAE/SMI weight ratio of about 0.2 to about 24, about 0.2 to about 19, about 0.5 to about 11.5, about 0.5 to about 5, or about 1 to about 5. In another example, the resin composition and/or the strengthened fiber product can have a SMI/UF weight ratio of about 0.2 to about 24, about 0.2 to about 19, about 0.5 to about 11.5, about 0.5 to about 5, or about 1 to about 5. In yet another example, the resin composition and/or the strengthened fiber product can have a PAE/UF weight ratio of about 0.2 to about 24, about 0.2 to about 19, about 0.5 to about 11.5, about 0.5 to about 5, or about 1 to about 5.

The resin composition can be present in an amount of about 0.91 kg to about 22.7 kg, about 1.81 kg to about 16.3 kg, about 2.72 kg to about 10.9 kg, or about 3.63 kg to about 7.26 kg per 907.2 kg of the strengthened fiber product. For example, the resin composition can be present in an amount of about 5.44 kg per 907.2 kg of the strengthened fiber product. The PAE resin of the resin composition can be present in an amount of about 0.46 kg to about 29.1 kg, about 0.91 kg to about 18.1 kg, about 1.81 kg to about 13.6 kg, about 2.27 kg to about 9.07 kg, or about 3.63 kg to about 5.44 kg per 907.2 kg of the strengthened fiber product. For example, the PAE resin can be present in an amount of about 0.91 kg, about 1.81 kg, or about 2.27 kg per 907.2 kg of the strengthened fiber product. The cationic SMI resin can be present in an amount of about 0.46 kg to about 29.1 kg, about 0.91 kg to about 18.1 kg, about 1.81 kg to about 13.6 kg, about 2.27 kg to about 9.07 kg, or about 3.63 kg to about 5.44 kg per 907.2 kg of the strengthened fiber product. For example, the cationic SMI resin can be present an amount of about 0.91 kg, about 1.81 kg, or about 2.27 kg per 907.2 kg of the strengthened fiber product. The UF resin of the resin composition can be present in an amount of about 0.46 kg to about 29.1 kg, about 0.91 kg to about 18.1 kg, about 1.81 kg to about 13.6 kg, about 2.27 kg to about 9.07 kg, or about 3.63 kg to about 5.44 kg per 907.2 kg of the strengthened fiber product. For example, the UF resin can be present an amount of about 0.91 kg, about 1.81 kg, or about 2.27 kg per 907.2 kg of the strengthened fiber product. The strengthened fiber product can generally have a basis weight of about 40.7 g/m$^2$ to about 122.1 g/m$^2$, about 48.9 g/m$^2$ to about 97.7 g/m², about 57 g/m² to about 81.4 g/m², or about 65.1 g/m² to about 73.3 g/m², for example, about 68.4 g/m², for example, about 69 g/m².

In one or more examples, the strengthened fiber product containing the resin composition of the PAE resin, the cationic SMI resin, and the UF resin can exhibit improved or increased tensile strength over a strengthening resin utilizing the PAE resin, the cationic SMI resin, and the UF resin individually.

The strengthened fiber product can have a dry tensile strength of about 1 kN/m to about 10 kN/m, about 2 kN/m to about 9 kN/m, about 3 kN/m to about 8 kN/m, about 4 kN/m to about 7 kN/m, or about 5 kN/m to about 6 kN/m. For example, the strengthened fiber product can have a dry tensile strength of about 1 kN/m, about 2 kN/m, about 3 kN/m, about 4 kN/m, about 5 kN/m, about 6 kN/m, about 7 kN/m, about 8 kN/m, about 9 kN/m, or about 10 kN/m. In another example, the strengthened fiber product can have a dry tensile strength of about 4.75 kN/m, about 4.8 kN/m, about 4.94 kN/m, or about 5.01 kN/m. The dry tensile strength of the strengthened fiber product can be measured according to TAPPI-T-494 om-13.

In another example, the strengthened fiber product containing the resin composition can have a wet tensile strength of about 0.1 kN/m to about 1 kN/m, about 0.2 kN/m to about 0.9 kN/m, about 0.3 kN/m to about 0.8 kN/m, about 0.4 kN/m to about 0.7 kN/m, or about 0.5 kN/m to about 0.6 kN/m. For example, the strengthened fiber product containing the resin composition can have a wet tensile strength of about 0.1 kN/m, about 0.2 kN/m, about 0.3 kN/m, about 0.4 kN/m, about 0.5 kN/m, about 0.6 kN/m, about 0.7 kN/m, about 0.8 kN/m, about 0.9 kN/m, or about 1 kN/m. In another example, the strengthened fiber product containing the resin composition can have a wet tensile strength of about 0.56 kN/m, about 0.68 kN/m, about 0.78 kN/m, or about 0.79 kN/m. The wet tensile strength of the strengthened fiber product can be measured according to TAPPI T-456 om-10.

In at least one example, the strengthened fiber product containing the resin composition can have a wet-to-dry (W/D) tensile strength ratio of about 5 to about 30, about 7 to about 25, or about 10 to about 20. For example, the strengthened fiber product containing the resin composition can have a wet-to-dry (W/D) tensile strength ratio of about 10, about 11, about 12, about 13, about 14, about 15, about 16, about 17, about 18, about 19, about 20.

EXAMPLES

In order to provide a better understanding of the foregoing discussion, the following non-limiting examples are offered. Although the examples can be directed to specific embodiments, they are not to be viewed as limiting the invention in any specific respect.

The synergistic effects due to the resin composition contained within the strengthened fiber products are highlighted by the results of comparative examples (CEx.) 1-4 and inventive examples (Ex.) 1-4, which are summarized below in Table 1. The resin compositions contained varying blends of the PAE resin, the cationic SMI resin, and the UF resin within each of the strengthened fiber products. The dry tensile strength of the fiber products (CEx. 1-4 and Ex. 1-4) was measured according to TAPPI-T-494 om-13. The wet tensile strength of the fiber products (CEx. 1-4 and Ex. 1-4) was measured according to TAPPI T-456 om-10.

Preparation of the PAE Resin

The PAE resin utilized in the following examples (CEx. 2 and Ex. 1-4) was prepared according to the following procedure. To prepare the PAE resin, a polyamidoamine prepolymer was first prepared. To prepare the polyamidoamine prepolymer, a glass reactor with a 5-neck top was equipped with a stainless steel stirring shaft, a reflux condenser, and a temperature probe. About 1574.5 g of DBE-5 (glutaric acid dimethyl ester, or dibasic ester) was added to the reactor. The stirrer was turned on and about 1,038.9 g of DETA was added to the reactor under stirring. The reactor was immersed in a hot oil bath and heated to a temperature of about 100° C. At about 90° C., the reaction mixture began to reflux. The reflux condenser was reconfigured for distillation and a distillate was collected in a separate receiver. The reaction mixture was sampled at 30 minute intervals. Each of the samples was diluted to about 45 wt % solids with water, and the viscosity was measured with a Brookfield viscometer at about 20° C. When the sample reached about 220 cP, the distillation condenser was reconfigured for reflux. Water was slowly added to the reaction mixture through the reflux condenser to dilute and cool the reaction mixture. The reaction mixture containing the polyamidoamine prepolymer was diluted to about 45 wt % solids, and had a viscosity of about 220 cP (measured with a Brookfield viscometer at 20° C.).

To prepare the PAE resin from the polyamidoamine prepolymer, a glass reactor with a 5-neck top was equipped with a glass stirring shaft and Teflon paddle, an equal pressure addition funnel, a temperature and pH probe, stainless steel cooling coils, a sample valve, and a heating mantle. About 445.64 g of the polyamidoamine prepolymer and about 5.25 g of water was added to the reactor and stirred. The reaction mixture was heated to a temperature of about 35° C. and about 2.028 g of N,N-methylene-bis-acrylamide obtained from Pfaltz & Bauer, Inc. was added. The reaction mixture was then heated to about 60° C. and held at that temperature for about 4 hours to produce an intermediate (partially cross-linked) prepolymer mixture. The viscosity of the intermediate prepolymer mixture was measured to be about 384 cP (measured with a Brookfield viscometer at 20° C.).

The intermediate prepolymer mixture was adjusted to a temperature of about 25° C. and about 88.46 g of water was added. The reaction mixture was then adjusted to a temperature of about 21° C., and about 121.21 g of epichlorohydrin was added over a period of about 75 minutes. This reaction mixture was then allowed to warm to a temperature of about 25° C. over a period of about 45 minutes, and about 446.27 g of water was added. This reaction mixture was then heated to a temperature of about 45° C., and after about 2 hours, the reaction mixture was further heated to about 55° C. After about 4 hours, the pH of the reaction mixture was adjusted to about 2.87 by adding a mixture of formic acid and sulfuric acid. The reaction mixture containing the PAE resin was then cooled to a temperature of about 25° C. and diluted to about 25 wt % solids. The viscosity was measured to be about 187 cP (measured with a Brookfield viscometer at 20° C.).

Preparation of the Cationic SMI Resin

The cationic SMI resin utilized in the following examples (CEx. 3 and Ex. 1-4) was a copolymer of styrene and DMAPA maleimide acetate. The cationic SMI resin had the chemical formula (H) and a weight average molecular weight of about 80,000. The cationic SMI resin was prepared according to the following procedure. An acetic acid solution was prepared by dissolving about 13 g of acetic acid in about 550 g of deionized water. The reaction was initiated by dissolving about 140 g of a copolymer of styrene and DMAPA maleimide in the acetic acid solution. The reaction was performed at about 70° C. for about 5 hours. After the reaction, the reaction mixture was filtered, and the resulting solution had about 20 wt % solids and a pH of about 4.5 at a temperature of about 25° C.

Preparation of the UF Resin

The UF resin utilized in the following examples (CEx. 4 and Ex. 1-4) was prepared according to the following procedures. A 4 liter (l) glass reactor with a 5-neck top was equipped with a glass stirring shaft, a collar, a reflux condenser, a temperature probe, a pH probe, stainless steel cooling coils, a vacuum sample tube, and a heating mantle. About 852.4 grams (g) of 50% formaldehyde was added to the reactor. The stirrer was turned on or activated to stir the 50% formaldehyde, and about 441.2 g of water was subsequently added to the reactor. The pH of the water and 50% formaldehyde mixture was adjusted to a pH of about 8.5 by adding about 0.33 g of 50% sodium hydroxide. About 61.3 g of diethylenetriamine was added to the mixture over a period of about 20 minutes, and the resulting exothermic reaction was controlled to a temperature of about 55° C. with the stainless steel cooling coils. About 91 g of water was subsequently added to the mixture, and the pH of the mixture was measured to be about 9.3. Under continued cooling, about 353.4 g of urea-prill was added to the mixture, and the reaction temperature was controlled to about 62° C. with the stainless steel cooling coils. The pH of the mixture after the addition of the urea-prill was measured to be about 8.5 at a temperature of about 62° C. The mixture was then heated to about 80° C. and held at about 80° C. for about 20 minutes. While maintaining the temperature of the mixture at about 80° C., the pH was also maintained at about 8.3 with the additions of sodium hydroxide. After maintaining the temperature at about 80° C. for about 20 minutes, about 55.7 g of 18% hydrochloric acid was added to the mixture. The reaction mixture was heated to a temperature of about 83° C. and an additional amount of about 55.7 g of 18% hydrochloric acid was added. The addition of the 18% hydrochloric acid resulted in an exothermic reaction that heated the mixture to a temperature of about 87° C. The pH of the mixture was adjusted to about 3.8 with additions of 18% hydrochloric acid. The viscosity of the mixture was measured about every 10 minutes using Gardner-Holdt bubble tubes. The viscosity of the mixture generally increased over a period of about 1 hour to a Gardner-Holdt value of about an E. About 281.3 g of water was added to the mixture, and the temperature was adjusted to about 71° C. with the stainless steel cooling coils. Over a period of about 1 hour, the pH of the mixture was allowed to increase to a pH of about 4 while cooling the mixture to about 65° C. During the period of about 1 hour when the mixture was cooled to about 65° C., 18% hydrochloric acid was added to maintain the pH at about 4 and the viscosity of the mixture generally increased to a Gardner-Holdt value of about a G. Once the viscosity of about a G was reached, about 147 g of water was added to the mixture, and the reaction temperature was controlled to about 61° C. The viscosity of the mixture after the addition of the about 147 g of water was measured about every 10 minutes. The viscosity of the mixture generally advanced toward a Gardner-Holdt value of about EF over about 30 minutes. When the viscosity was about EF, about 489 g of water was added, and the reaction temperature was cooled to about 50° C. Over a period of about 5 minutes and after the addition of the about 489 g of water, about 12 g of sodium hydroxide was added to the mixture while continuously cooling the mixture with the stainless steel cooling coils. After the addition of the about 12 g of sodium hydroxide, about 89.8 g of urea-prill was added. The reaction temperature was subsequently adjusted to about 45° C. over a period of about 60 minutes. After the period of about 60 minutes, 50% sodium hydroxide was added to the mixture to adjust the pH to about 6.5. After the pH of the mixture was adjusted to about 6.5, about 143 g of water was added. The mixture was then cooled to about 25° C. and a sufficient amount of water was added to adjust the solids concentration of the mixture. The resulting UF resin had a concentration of solids of about 25%, a pH of about 6.5, and a viscosity (measured with a Brookfield viscometer) of about 20 cP at a temperature of about 25° C. The resulting UF resin was measured/tested for free formaldehyde with a sodium sulfate—ice method, and was found to contain about 0.2% of the free formaldehyde.

Comparative Example 1—Forming a Fiber Product without a Strengthened Resin

A bleached furnish (about 60% hardwood and about 40% softwood) was diluted with water to a consistency of about 0.86% for CSF of 465. The pH was adjusted to about 7 and no strengthening resin was added. The paper product was made on the Noble & Wood sheet former, pressed once at about 137.9 kPa between two blotters and dried on an Adirondack dryer with one pass at about 115.6° C. The sheets were cured at about 105° C. for about 5 minutes. The paper product (basis weight of about 69 g/m$^2$) had a dry tensile strength of about 3.755 kN/m and a wet tensile strength of about 0.166 kN/m.

Comparative Example 2—Forming a Fiber Product with a PAE Resin

A bleached furnish (about 60% hardwood and about 40% softwood) was diluted with water to a consistency of about 0.86% for CSF of 465. The pH was adjusted to about 7 and a PAE resin was added to provide a strengthening resin. The strengthening resin was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the PAE resin in a concentration of about 5.44 kg per 907.2 kg of the dried paper product. The paper product (basis weight of about 69 g/m$^2$) was tested to have a dry tensile strength of about 4.464 kN/m and a wet tensile strength of about 1.199 kN/m.

Comparative Example 3—Forming a Fiber Product with a Cationic SMI Resin

A bleached furnish (about 60% hardwood and about 40% softwood) was diluted with water to a consistency of about 0.86% for CSF of 465. The pH was adjusted to about 7 and a cationic SMI resin was added to provide a strengthening resin. The strengthening resin was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the cationic SMI resin in a concentration of about 5.44 kg per 907.2 kg of the dried paper product. The paper product (basis weight of about 69 g/m²) was tested to have a dry tensile strength of about 4.12 kN/m and a wet tensile strength of about 0.317 kN/m.

Comparative Example 4—Forming a Fiber Product with a UF Resin

A bleached furnish (about 60% hardwood and about 40% softwood) was diluted with water to a consistency of about 0.86% for CSF of 465. The pH was adjusted to about 7 and a UF resin was added to provide a strengthening resin. The strengthening resin was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the UF resin in a concentration of about 5.44 kg per 907.2 kg of the dried paper product. The paper product (basis weight of about 69 g/m²) was tested to have a dry tensile strength of about 4.483 kN/m and a wet tensile strength of about 0.317 kN/m.

Inventive Example 1—Forming a Fiber Product with a Resin Composition that Included about 33.3% PAE Resin, about 33.3% Cationic SMI Resin, and about 33.3% UF Resin A bleached furnish (about 60% hardwood and about 40% softwood) was diluted with water to a consistency of about 0.86% for a CSF of 465. The pH was adjusted to about 7 and a PAE resin was added. After about 60 seconds, a cationic SMI resin and a UF resin were added to provide a resin composition. The resin composition was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the PAE resin in a concentration of about 1.81 kg per 907.2 kg of the dried paper product, the cationic SMI resin in a concentration of about 1.81 kg per 907.2 kg of the dried paper product, and the UF resin in a concentration of about 1.81 kg per 907.2 kg of the dried paper product. The paper product (basis weight of about 69 g/m²) was tested to have a dry tensile strength of about 4.832 kN/m, and a wet tensile strength of about 0.682 kN/m.

Inventive Example 2—Forming a Fiber Product with a Resin Composition that Included about 41.67% PAE Resin, about 41.67% Cationic SMI Resin, and about 16.67% UF Resin A bleached furnish (about 60% hardwood and about 40% softwood) was diluted with water to a consistency of about 0.86% for a CSF of 465. The pH was adjusted to about 7 and a PAE resin was added. After about 60 seconds, a cationic SMI resin and a UF resin were added to provide a resin composition. The resin composition was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the PAE resin in a concentration of about 2.27 kg per 907.2 kg of the dried paper product, the cationic UF resin in a concentration of about 2.27 kg per 907.2 kg of the dried paper product, and the UF resin in a concentration of about 0.91 kg per 907.2 kg of the dried paper product. The paper product (basis weight of about 69 g/m²) was tested to have a dry tensile strength of about 4.748 kN/m, and a wet tensile strength of about 0.781 kN/m.

Inventive Example 3—Forming a Fiber Product with a Resin Composition that Included about 41.67% PAE Resin, about 16.67% Cationic SMI Resin, and about 41.67% UF Resin A bleached furnish (about 60% hardwood and about 40% softwood) was diluted with water to a consistency of about 0.86% for a CSF of 465. The pH was adjusted to about 7 and a PAE resin was added. After about 60 seconds, a cationic SMI resin and a UF resin were added to provide a resin composition. The resin composition was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the PAE resin in a concentration of about 2.27 kg per 907.2 kg of the dried paper product, the cationic SMI resin in a concentration of about 0.91 kg per 907.2 kg of the dried paper product, and the UF resin in a concentration of about 2.27 kg per 907.2 kg of the dried paper product. The paper product (basis weight of about 69 g/m²) was tested to have a dry tensile strength of about 4.942 kN/m and a wet tensile strength of about 0.788 kN/m.

Inventive Example 4—Forming a Fiber Product with a Resin Composition that Included about 16.67% PAE Resin, about 41.67% Cationic SMI Resin, and about 41.67% UF Resin A bleached furnish (about 60% hardwood and about 40% softwood) was diluted with water to a consistency of about 0.86% for a CSF of 465. The pH was adjusted to about 7 and a PAE resin was added. After about 60 seconds, a cationic SMI resin and a UF resin were added to provide a resin composition. The resin composition was added to individual sheets with no white water recycling within each run. The paper product was made on the Noble & Wood sheet former, pressed once at about 137.9 kPa between two blotters and dried on the Adirondack dryer with one pass at about 115.6° C. The sheets were cured at about 105° C. for about 5 minutes. The dried paper product contained the PAE resin in a concentration of about 0.91 kg per 907.2 kg of the dried paper product, the cationic SMI resin in a concentration of about 2.27 kg per 907.2 kg of the dried paper product, and the UF resin in a concentration of about 2.27 kg per 907.2 kg of the dried paper product. The paper product (basis weight of about 69 g/m²) was tested to have a dry tensile strength of about 5.014 kN/m and a wet tensile strength of about 0.562 kN/m.

TABLE 1

Effect of blends of a PAE resin, a cationic SMI resin, and a UF resin in CEx. 1-4 and Ex. 1-4

| EX. | PAE (wt %) | SMI (wt %) | UF (wt %) | Expected Wet Tensile (kN/m) | Expected Dry Tensile (kN/m) | Measured Wet Tensile (kN/m) | Measured Dry Tensile (kN/m) | Wet/Dry Tensile Ratio (%) |
|---|---|---|---|---|---|---|---|---|
| CEx. 1 | 0 | 0 | 0 | — | — | 0.166 | 3.755 | 4.42 |
| CEx. 2 | 100 | 0 | 0 | — | — | 1.199 | 4.464 | 26.86 |
| CEx. 3 | 0 | 100 | 0 | — | — | 0.364 | 4.123 | 8.83 |
| CEx. 4 | 0 | 0 | 100 | — | — | 0.317 | 4.483 | 7.07 |
| Ex. 1 | 33.3 | 33.3 | 33.3 | 0.625 | 4.352 | 0.682 | 4.832 | 14.11 |
| Ex. 2 | 41.67 | 41.67 | 16.67 | 0.691 | 4.417 | 0.781 | 4.748 | 16.45 |
| Ex. 3 | 41.67 | 16.67 | 41.67 | 0.704 | 4.330 | 0.788 | 4.942 | 15.94 |
| Ex. 4 | 16.67 | 41.67 | 41.67 | 0.483 | 4.328 | 0.562 | 5.014 | 11.21 |

As shown in Table 1 above, the fiber products made with the resin compositions that included the PAE resin, the cationic SMI resin, and the UF resin (Ex. 1-4) had significantly improved tensile strengths over the fiber product made with no strengthening resin and the fiber products made with only the PAE resin, the cationic SMI resin, and the UF resin alone (CEx. 1-4, respectively), based on the amount of each resin used.

Table 1 lists the weight concentrations of the PAE resin, the cationic SMI resin, and the UF resin in the strengthening resins of the comparative examples (CEx.) 1-4 and the resin compositions of the inventive examples (Ex.) 1-4. In CEx. 2-4 and Ex. 1-4, 907.2 kg of the fiber product, once dried and cured, contained about 5.44 kg of the PAE resin, the cationic SMI resin, and/or the UF resin.

Table 1 shows the expected wet tensile strength values, which were about 0.625 kN/m, about 0.691 kN/m, about 0.704 kN/m, and about 0.483 kN/m for Ex. 1-4, respectively. Table 1 also lists the expected dry tensile strength values, which were about 4.352 kN/m, about 4.417 kN/m, about 4.330 kN/m, and about 4.328 kN/m for Ex. 1-4, respectively. The expected tensile strength values were calculated for the strengthened fiber products containing the resin compositions under the premise that no synergistic effect was provided by combining the PAE resin, the cationic SMI resin, and the UF resin.

Table 1 also shows the actual or measured tensile values for the strengthened fiber products containing the resin compositions. Examples 1-4 had measured wet tensile values of about 0.682 kN/m, about 0.781 kN/m, about 0.788 kN/m, and about 0.562 kN/m, respectively. Ex. 1-4 also had measured dry tensile values of about 4.832 kN/m, about 4.748 kN/m, about 4.942 kN/m, and about 5.014 kN/m, respectively. Examples 1-4 had measured wet tensile strength values of about 9.1%, about 13%, about 11.9%, and about 16.4%, respectively, greater than the expected wet tensile strength for the resin compositions that contained the PAE resin, the cationic SMI resin, and the UF resin, respectively. Examples 1-4 also had measured dry tensile strength values of about 11%, about 7.5%, about 14.1%, and about 15.9%, respectively, greater than the expected dry tensile strength for the resin compositions containing the PAE resin, the cationic SMI resin, and the UF resin, respectively.

The data in Table 1 indicates that a synergistic effect occurred in the resin compositions of Examples 1-4, as the measured tensile strengths were greater than the expected tensile strengths. The increase in both the wet tensile strength and the dry tensile strength were surprising and unexpected.

In at least one example, the strengthened fiber product can have a wet-to-dry (W/D) tensile strength ratio of about 5 to about 20, about 10 to about 15, or about 11 to 14. For example, the strengthened fiber product can have a wet-to-dry (W/D) tensile strength ratio of about 10, about 11, about 12, about 13, about 14, about 15, about 16, about 17, about 18, about 19, or about 20.

Embodiments of the present disclosure further relate to any one or more of the following paragraphs:

1. A resin composition, comprising: a polyamide-epihalohydrin resin comprising a reaction product of a polyamidoamine and an epihalohydrin; a cationic styrene maleimide resin comprising a reaction product of a styrene maleic anhydride copolymer and an amine compound; and a urea-formaldehyde resin.

2. A fiber product comprising: a fiber web; and an at least partially cured resin composition, wherein, prior to at least partially curing, the resin composition comprises: a polyamide-epihalohydrin resin comprising a reaction product of a polyamidoamine and an epihalohydrin; a cationic styrene maleimide resin comprising a reaction product of a styrene maleic anhydride copolymer and an amine compound; and a urea-formaldehyde resin.

3 A method for making a fiber product, comprising: combining a resin composition with a plurality of fibers to produce a fiber mixture, wherein the resin composition comprises: a polyamide-epihalohydrin resin comprising a reaction product of a polyamidoamine and an epihalohydrin; a cationic styrene maleimide resin comprising a reaction product of a styrene maleic anhydride copolymer and an amine compound; and a urea-formaldehyde resin; forming fiber sheets from the fiber mixture, wherein the fiber sheets comprise the fibers, the polyamide-epihalohydrin resin, the cationic styrene maleimide resin, and the urea-formaldehyde resin; and at least partially curing the polyamide-epihalohydrin resin, the cationic styrene maleimide resin, and the urea-formaldehyde resin in the fiber sheets to form the fiber product.

4. A wet and dry strengthened fiber product, comprising: a fiber web; and an at least partially cured wet and dry strengthening resin, wherein, prior to at least partially curing, the wet and dry strengthening resin comprises: a polyamide-epihalohydrin resin comprising a reaction product of a polyamidoamine and an epihalohydrin; a cationic styrene maleimide resin comprising a reaction product of a styrene maleic anhydride copolymer and an amine compound, a weight average molecular weight of about 3,000 to about 200,000, and a styrene to maleimide molar ratio of about 1:1 to about 5:1; and a urea-formaldehyde resin comprising a formaldehyde to urea molar ratio of about 0.3:1 to about 6:1, and a weight average molecular weight of about 200 to about 500,000, wherein: the polyamide-epihalohydrin resin is present in the wet and dry strengthening resin in an amount of about 10 wt % to about 90 wt %, based on a combined solids weight of the polyamide-epihalohydrin resin, the cationic styrene maleimide resin, and the urea-formaldehyde resin, the cationic styrene maleimide resin is present in the wet and dry strengthening resin in an amount of about 10 wt % to about 90 wt %, based on a combined solids weight of the polyamide-epihalohydrin resin, the cationic styrene maleimide resin, and the urea-formaldehyde resin, the urea-formaldehyde resin is present in the wet and dry strengthening resin in an amount of about 10 wt % to about 90 wt %, based on a combined solids weight of the polyamide-epihalohydrin resin, the cationic styrene maleimide resin, and the urea-formaldehyde resin, and the wet and dry strengthening resin is present in the wet and dry strengthened fiber product in an amount of about 0.05 wt % to about 5 wt %, based on a dried weight of the wet and dry strengthened fiber product.

5. The resin composition, the fiber product, or the method according to any one of paragraphs 1 to 4, wherein the cationic styrene maleimide resin has a weight average molecular weight of about 3,000 to about 200,000, and a styrene to maleimide molar ratio of about 1:1 to about 5:1.

6. The resin composition, the fiber product, or the method according to any one of paragraphs 1 to 5, wherein the urea-formaldehyde resin has a weight average molecular weight of about 2,000 to about 500,000, and a formaldehyde to urea molar ratio of about 0.5:1 to about 1.2:1.

7. The resin composition, the fiber product, or the method according to any one of paragraphs 1 to 6, wherein the resin composition comprises about 20 wt % to about 80 wt % of the polyamide-epihalohydrin resin, based on a combined solids weight of the polyamide-epihalohydrin resin, the cationic styrene maleimide resin, and the urea-formaldehyde resin.

8. The resin composition, the fiber product, or the method according to any one of paragraphs 1 to 7, wherein the resin composition comprises about 20 wt % to about 80 wt % of the cationic styrene maleimide resin, based on a combined solids weight of the polyamide-epihalohydrin resin, the cationic styrene maleimide resin, and the urea-formaldehyde resin.

9. The resin composition, the fiber product, or the method according to any one of paragraphs 1 to 8, wherein the resin composition comprises about 20 wt % to about 80 wt % of the urea-formaldehyde resin, based on a combined solids weight of the polyamide-epihalohydrin resin, the cationic styrene maleimide resin, and the urea-formaldehyde resin.

10. The resin composition, the fiber product, or the method according to any one of paragraphs 1 to 9, wherein the weight average molecular weight of the cationic styrene maleimide resin is about 4,000 to about 150,000, and the resin composition comprises about 25 wt % to about 70 wt % of the cationic styrene maleimide resin, based on a combined solids weight of the polyamide-epihalohydrin resin, the cationic styrene maleimide resin, and the urea-formaldehyde resin.

11. The resin composition, the fiber product, or the method according to any one of paragraphs 1 to 4, wherein the resin composition comprises: about 30 wt % to about 70 wt % of the cationic styrene maleimide resin, based on a combined solids weight of the polyamide-epihalohydrin resin, the cationic styrene maleimide resin, and the urea-formaldehyde resin; about 30 wt % to about 70 wt % of the polyamide-epihalohydrin resin, based on a combined solids weight of the polyamide-epihalohydrin resin, the cationic styrene maleimide resin, and the urea-formaldehyde resin; and about 30 wt % to about 70 wt % of the urea-formaldehyde resin, based on a combined solids weight of the polyamide-epihalohydrin resin, the cationic styrene maleimide resin, and the urea-formaldehyde resin.

12. The resin composition, the fiber product, or the method according to any one of paragraphs 1 to 11, wherein the resin composition comprises: about 30 wt % to about 50 wt % of the cationic styrene maleimide resin, based on a combined solids weight of the polyamide-epihalohydrin resin, the cationic styrene maleimide resin, and the urea-formaldehyde resin; about 30 wt % to about 50 wt % of the polyamide-epihalohydrin resin, based on a combined solids weight of the polyamide-epihalohydrin resin, the cationic styrene maleimide resin, and the urea-formaldehyde resin; and about 30 wt % to about 50 wt % of the urea-formaldehyde resin, based on a combined solids weight of the polyamide-epihalohydrin resin, the cationic styrene maleimide resin, and the urea-formaldehyde resin.

13. The resin composition, the fiber product, or the method according to any one of paragraphs 1 to 12, wherein the cationic styrene maleimide resin comprises one or more copolymers of styrene and dimethylaminopropylamine maleimide acetate.

14. The resin composition, the fiber product, or the method according to any one of paragraphs 1 to 13, wherein the cationic styrene maleimide resin has the chemical formula:

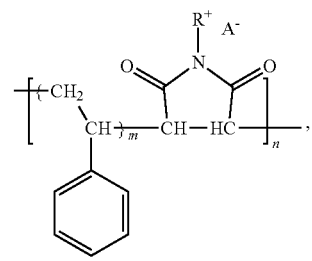

wherein: $R^+$ is a cationic molecular group; $A^-$ is an anion; m is an integer of 1 to about 5; and n is an integer of about 5 to about 800.

15. The resin composition, the fiber product, or the method according to paragraph 14, wherein the cationic molecular group is a cationic ammonium group, wherein the anion is a carboxylate, and the carboxylate is an acetate anion, a citrate anion, an oxalate anion, a lactate anion, a formate anion, or any mixture thereof.

16. The resin composition, the fiber product, or the method according to paragraph 15, wherein the cationic molecular group is a cationic ammonium group, wherein the anion is a carboxylate, and the carboxylate is an acetate anion, a citrate anion, an oxalate anion, a lactate anion, a formate anion, or any mixture thereof.

17. The resin composition, the fiber product, or the method according to any one of paragraphs 14 to 16, wherein m is equal to 1 and n is an integer of about 5 to about 100, or wherein m is equal to 3 and n is an integer of about 50 to about 300.

18. The resin composition, the fiber product, or the method according to any one of paragraphs 1 to 13, wherein the cationic styrene maleimide resin has the chemical formula:

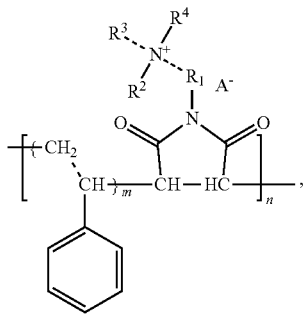

wherein: $R^1$ is a substituted or unsubstituted organic diyl group; $R^2$, $R^3$, and $R^4$ are independently selected from a hydrogen or a substituted or unsubstituted, linear or branched, cyclic, heterocyclic, or aromatic hydrocarbyl group; $A^-$ is an anion; m is an integer of 1 to about 5; and n is an integer of about 5 to about 800.

19. The resin composition, the fiber product, or the method according to paragraph 18, wherein $R^1$ is selected from the group consisting of: methanediyl, ethanediyl, propanediyl, butanediyl, pentanediyl, and any mixture thereof, wherein $R^2$, $R^3$, and $R^4$ are independently selected from the group consisting of: hydrogen, methyl, ethyl, propyl, butyl, and pentyl.

20. The resin composition, the fiber product, or the method according to paragraph 18, wherein $R^1$ comprises propanediyl.

21. The resin composition, the fiber product, or the method according to paragraph 20, wherein $R^2$, $R^3$, and $R^4$ are independently selected from the group consisting of: hydrogen, methyl, ethyl, propyl, butyl, pentyl, and derivatives thereof.

22. The resin composition, the fiber product, or the method according to any one of paragraphs 1 to 13, wherein the cationic styrene maleimide resin has the chemical formula:

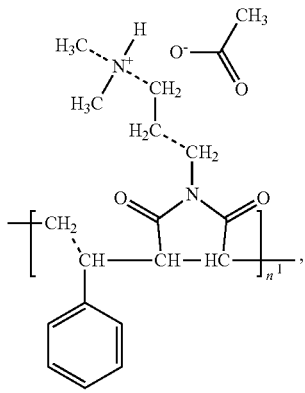

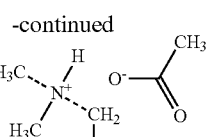

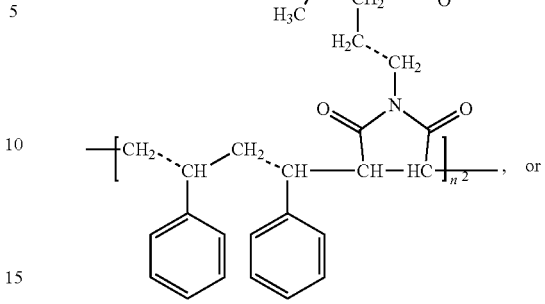

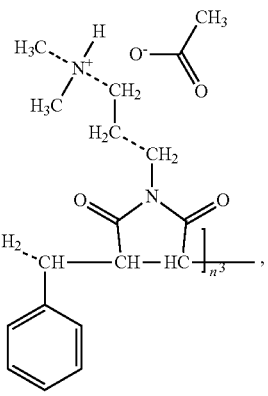

wherein: $A^-$ is an anion; and $n^1$, $n^2$, and $n^3$ are independently an integer of about 5 to about 800.

23. The resin composition, the fiber product, or the method according to paragraph 22, wherein the anion is a carboxylate, wherein $n^1$ is about 5 to about 100, $n^2$ is about 20 to about 200, and $n^3$ is about 50 to about 300.

24. The resin composition, the fiber product, or the method according to paragraph 23, wherein the anion is a carboxylate, a halide, a phosphate, a sulfate, a borate, or any mixture thereof.

25. The resin composition, the fiber product, or the method according to paragraph 23, wherein the anion is a carboxylate, and the carboxylate is an acetate anion, a citrate anion, or any mixture thereof.

26. The resin composition, the fiber product, or the method according to paragraph 25, wherein $n^1$ is about 5 to about 100, $n^2$ is about 20 to about 200, and $n^3$ is about 50 to about 300.

27. The resin composition, the fiber product, or the method according to any one of paragraphs 1 to 26, further comprising a plurality of fibers.

28. The fiber product or the method according to any one of paragraphs 2 to 27, further comprising: a dry tensile strength of about 1 kN/m to about 6 kN/m; a wet tensile strength of about 0.1 kN/m to about 1 kN/m; and a wet-to-dry tensile strength ratio of about 10 to about 20.

29. The fiber product or the method according to any one of paragraphs 2 to 28, further comprising: a dry tensile strength of about 3 kN/m to about 8 kN/m; a wet tensile strength of about 0.3 kN/m to about 0.8 kN/m; and a wet-to-dry tensile strength ratio of about 7 to about 25.

30. The fiber product or the method of any one of paragraphs 2 to 29, further comprising: a dry tensile strength of about 4 kN/m to about 7 kN/m; a wet tensile strength of about 0.5 kN/m to about 0.6 kN/m; and a wet-to-dry tensile strength ratio of about 10 to about 20.

31. The method according to paragraph 3, wherein forming the fiber sheets further comprises: passing the fiber mixture through a sheet former to form the fiber sheets; pressing the fiber sheets between two blotters at a pressure of about 103.5 kPa to about 172.9 kPa; and drying the fiber sheets by heating the fiber sheets at a drying temperature of about 110° C. to about 150° C. with a sheet dryer.

32. The method according to paragraph 3, further comprising: adding the polyamide-epihalohydrin resin to an aqueous suspension comprising the fibers; adding the cationic styrene maleimide resin to the aqueous suspension comprising the fibers and the polyamide-epihalohydrin resin; and adding the urea-formaldehyde resin to the aqueous suspension comprising the fibers, the polyamide-epihalohydrin resin, and the cationic styrene maleimide resin to form the fiber mixture comprising the fibers, the polyamide-epihalohydrin resin, the cationic styrene maleimide resin, and the urea-formaldehyde resin.

33. The method according to paragraph 3, further comprising: adding the polyamide-epihalohydrin resin to an aqueous suspension comprising the fibers; adding the urea-formaldehyde resin to the aqueous suspension comprising the fibers and the polyamide-epihalohydrin resin; and adding the cationic styrene maleimide resin to the aqueous suspension comprising the fibers, the polyamide-epihalohydrin resin, and the urea-formaldehyde resin to form the fiber mixture comprising the fibers, the polyamide-epihalohydrin resin, the cationic styrene maleimide resin, and the urea-formaldehyde resin.

34. The method according to paragraph 32 or 33, wherein the aqueous suspension is adjusted to a pH value of about 6 to about 8 prior to adding the polyamide-epihalohydrin resin.

35. The method according to any one of paragraphs 3 or 5 to 34, further comprising: adding the cationic styrene maleimide resin to an aqueous suspension comprising the fibers; adding the polyamide-epihalohydrin resin to the aqueous suspension comprising the fibers and the cationic styrene maleimide resin; and adding the urea-formaldehyde resin to the aqueous suspension comprising the fibers, the polyamide-epihalohydrin resin, and the cationic styrene maleimide resin to form the fiber mixture comprising the fibers, the polyamide-epihalohydrin resin, the cationic styrene maleimide resin, and the urea-formaldehyde resin.

36. The method according to any one of paragraphs 3 or 5 to 34, further comprising: adding the cationic styrene maleimide resin to an aqueous suspension comprising the fibers; adding the urea-formaldehyde resin to the aqueous suspension comprising the fibers and the cationic styrene maleimide resin; and adding the polyamide-epihalohydrin resin to the aqueous suspension comprising the fibers, the cationic styrene maleimide resin, and the urea-formaldehyde resin to form the fiber mixture comprising the fibers, the polyamide-epihalohydrin resin, the cationic styrene maleimide resin, and the urea-formaldehyde resin.

37. The method according to paragraph 35 or 36, wherein the aqueous suspension is adjusted to a pH value of about 6 to about 8 prior to adding the cationic styrene maleimide resin.

38. The method according to any one of paragraphs 3 or 5 to 34, further comprising: adding the urea-formaldehyde resin to an aqueous suspension comprising the fibers; adding the polyamide-epihalohydrin resin to the aqueous suspension comprising the fibers and the urea-formaldehyde resin; and adding the cationic styrene maleimide resin to the aqueous suspension comprising the fibers, the urea-formaldehyde resin, and the polyamide-epihalohydrin resin to form the fiber mixture comprising the fibers, the polyamide-epihalohydrin resin, the cationic styrene maleimide resin, and the urea-formaldehyde resin.

39. The method according to any one of paragraphs 3 or 5 to 34, further comprising: adding the urea-formaldehyde resin to an aqueous suspension comprising the fibers; adding the cationic styrene maleimide resin to the aqueous suspension comprising the fibers and the urea-formaldehyde resin; and adding the polyamide-epihalohydrin resin to the aqueous suspension comprising the fibers, the urea-formaldehyde resin, and the cationic styrene maleimide resin to form the fiber mixture comprising the fibers, the polyamide-epihalohydrin resin, the cationic styrene maleimide resin, and the urea-formaldehyde resin.

40. The method according to paragraph 38 or 39, wherein the aqueous suspension is adjusted to a pH value of about 6 to about 8 prior to adding the urea-formaldehyde resin.

41. The method according to any one of paragraphs 3 or 5 to 40, wherein forming the fiber sheets further comprises: passing the fiber mixture through a sheet former to form the fiber sheets; applying pressure to the fiber sheets; and drying the fiber sheets.

42. The method according to paragraph 41, wherein applying pressure to the fiber sheets includes applying pressure to the fiber sheets with at least one blotter, wherein the pressure if about 69 kPa to about 207 kPa.

43. The method according to an one of paragraphs 3 or 5 to 42, wherein at least partially curing the polyamide-epihalohydrin resin, the cationic styrene maleimide resin, and the urea-formaldehyde resin in the fiber sheets includes forming an at least partially cured wet strengthening resin.

44. The fiber product or the method according to any one of paragraphs 2 to 43, wherein the fiber product has a basis weight of about 48.9 g/m$^2$ to about 97.7 g/m$^2$, and wherein the styrene to maleimide molar ratio is about 1:1 to about 3:1.

45. The resin composition, the fiber product, or the method according to any one of paragraphs 1 to 13 or 27 to 44, wherein the cationic styrene maleimide resin has the chemical formula:

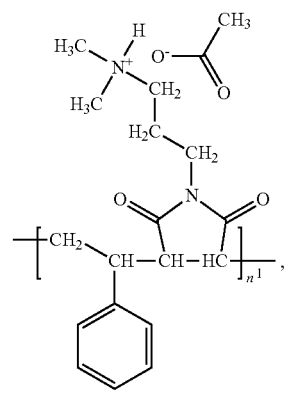

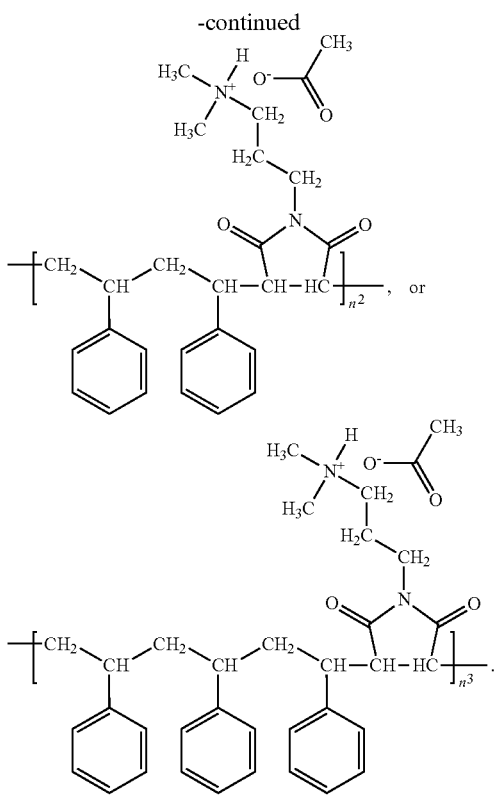

wherein $n^1$ is about 5 to about 100, $n^2$ is about 20 to about 200, and $n^3$ is about 50 to about 300.

46. The resin composition, the fiber product, or the method according to paragraph 45, wherein $n^1$ is about 5 to about 100, $n^2$ is about 20 to about 200, and $n^3$ is about 50 to about 300.

47. The resin composition, the fiber product, or the method according to any one of paragraphs 1 to 46, wherein the polyamidoamine is a reaction product of a polyamine and a dicarboxylic acid, and wherein the polyamine is in a concentration of about 0.9 moles to about 1.1 moles and the dicarboxylic acid is in a concentration of about 0.9 moles to about 1.1 moles.

48. The resin composition, the fiber product, or the method according to any one of paragraphs 1 to 47, wherein the polyamide-epihalohydrin resin has a weight average molecular weight of about 20,000 to about 3,000,000, wherein the polyamide-epihalohydrin resin has an azetidinium ion ratio of about 0.55 to about 0.80, and wherein the polyamide-epihalohydrin resin has a charge density of about 1.5 mEq/g to about 3 mEq/g of solids.

49. The resin composition, the fiber product, or the method of any one of paragraphs 1 to 48 wherein the polyamide-epihalohydrin resin is a reaction product of a polyamidoamine and an epihalohydrin, and wherein the polyamidoamine is a reaction product of a polyamine and a dicarboxylic acid.

50. The resin composition, the fiber product, or the method according to paragraph 49, wherein the polyamidoamine is in a concentration of about 0.56 moles to about 1.35 moles, the epihalohydrin is in a concentration of about 0.75 moles to about 1.8 moles, the polyamine is in a concentration of about 0.9 moles to about 1.1 moles, and the dicarboxylic acid is in a concentration of about 0.9 moles to about 1.1 moles.

51. The resin composition, the fiber product, or the method according to paragraphs 49 or 50, wherein the polyamine comprises dimethylenetriamine, diethylenetriamine, triethylenetetramine, tripropylenetetramine, tetraethylenepentamine, pentaethylenehexamine, or any mixture thereof.

52. The resin composition, the fiber product, or the method according to any one of paragraphs 47 to 51, wherein the dicarboxylic acid is selected from the group consisting of: glutaric acid, adipic acid, azelaic acid, malonic acid, suberic acid, sebacic acid, succinic acid, oxalic acid, pimelic acid, and any mixture thereof.

53. The resin composition, the fiber product, or the method according to any one of paragraph 1 to 52, wherein the epihalohydrin is selected from the group consisting of: epichlorohydrin, epibromohydrin, epifluorohydrin, epiiodohydrin, and any mixture thereof.

54. The resin composition, the fiber product, or the method of any one according to any one of paragraphs 2 to 53, wherein the fiber web is a cellulosic fiber comprising at least one material selected from the group consisting of: bleached furnish, softwood, hardwood, paper pulp, mechanical pulp, and any mixture thereof.

55. The resin composition according to any one of paragraphs 1, 5 to 30, or 44 to 54, further comprising a plurality of fibers.

56. The resin composition according to paragraph 55, wherein the plurality of fibers comprises bleached furnish, softwood, hardwood, paper pulp, mechanical pulp, or any mixture thereof.

57. The resin composition according to paragraph 55, wherein the plurality of fibers comprise cellulosic fibers.

58. A method for making a fiber product, comprising: combining a resin composition with a plurality of fibers to produce a fiber mixture, wherein the resin composition comprises: a polyamide-epihalohydrin resin comprising a reaction product of a polyamidoamine and an epihalohydrin; a cationic styrene maleimide resin comprising a reaction product of a styrene maleic anhydride copolymer and an amine compound; and a urea-formaldehyde resin; forming a fiber sheet from the fiber mixture; and at least partially curing the polyamide-epihalohydrin resin, the cationic styrene maleimide resin, and the urea-formaldehyde resin in the fiber sheet to produce a fiber product.

59. A fiber product, comprising: a fiber web; and an at least partially cured resin composition, wherein, prior to curing, the resin composition comprises: a polyamide-epihalohydrin resin comprising a reaction product of a polyamidoamine and an epihalohydrin; a cationic styrene maleimide resin comprising a reaction product of a styrene maleic anhydride copolymer and an amine compound; and a urea-formaldehyde resin.

60. The method or fiber product according to paragraph 58 or 59, wherein the fiber product has a dry tensile strength of about 1 kN/m to about 6 kN/m, a wet tensile strength of about 0.1 kN/m to about 1 kN/m, and a wet-to-dry tensile strength ratio of about 10 to about 20.

61. The method or fiber product according to any one of paragraphs 58 to 60, wherein the cationic styrene maleimide resin, prior to curing, has a styrene to maleimide molar ratio of about 1:1 to about 5:1.

62. The method or fiber product according to any one of paragraphs 58 to 61, wherein the urea-formaldehyde resin, prior to curing, has a formaldehyde to urea molar ratio of about 0.5:1 to about 1.2:1.

63. The method or fiber product according to any one of paragraphs 58 to 62, wherein the resin composition, prior to curing, comprises about 30 wt % to about 70 wt % of the cationic styrene maleimide resin, based on a combined solids weight of the cationic styrene maleimide resin, the polyamide-epihalohydrin resin, and the urea-formaldehyde resin.

64. The method or fiber product according to any one of paragraphs 58 to 63, wherein the resin composition, prior to curing, comprises about 30 wt % to about 70 wt % of the polyamide-epihalohydrin resin based on a combined solids weight of the cationic styrene maleimide resin, the polyamide-epihalohydrin resin, and the urea-formaldehyde resin.

65. The method or fiber product according to any one of paragraphs 58 to 64, wherein the resin composition, prior to curing, comprises about 30 wt % to about 70 wt % of the urea-formaldehyde resin, based on a combined solids weight of the cationic styrene maleimide resin, the polyamide-epihalohydrin resin, and the urea-formaldehyde resin.

66. The method or fiber product according to any one of paragraphs 58 to 65, wherein the cationic styrene maleimide resin, prior to curing, has a weight average molecular weight of about 3,000 to about 200,000.

67. The method or fiber product according to any one of paragraphs 58 to 66, wherein the cationic styrene maleimide resin, prior to curing, has a styrene to maleimide molar ratio of about 1:1 to about 5:1.

68. The method or fiber product according to any one of paragraphs 58 to 67, wherein the urea-formaldehyde resin, prior to curing, has a weight average molecular weight of about 2,000 to about 500,000.

69. The method or fiber product according to any one of paragraphs 58 to 68, wherein the urea-formaldehyde resin, prior to curing, has a formaldehyde to urea molar ratio of about 0.5:1 to about 1.2:1.

70. The method or fiber product according to any one of paragraphs 58 or 60 to 69, wherein forming the fiber sheet comprises: passing the fiber mixture through a sheet former to form the fiber sheet; pressing the fiber sheet between two blotters at a pressure of about 103.5 kPa to about 172.9 kPa; and heating the fiber sheet to a temperature of about 110° C. to about 150° C. with a sheet dryer.

71. The resin composition, method, or fiber product according to any one of paragraphs 1-6, 13-62, or 66-70, wherein the resin composition comprises: about 16 wt % to about 42 wt % of the polyamide-epihalohydrin resin comprising a reaction product of a polyamidoamine and an epihalohydrin; about 16 wt % to about 42 wt % of the cationic styrene maleimide resin comprising a reaction product of a styrene maleic anhydride copolymer and an amine compound; and about 16 wt % to about 42 wt % of the urea-formaldehyde resin, based on a solids weight of the polyamide-epihalohydrin resin, the cationic styrene maleimide resin, and the urea-formaldehyde resin.

72. The resin composition, method, or fiber product according to any one of paragraphs 1-6, 13-62, or 66-70, wherein the resin composition comprises: about 17 wt % to about 41 wt % of the polyamide-epihalohydrin resin comprising a reaction product of a polyamidoamine and an epihalohydrin; about 17 wt % to about 41 wt % of the cationic styrene maleimide resin comprising a reaction product of a styrene maleic anhydride copolymer and an amine compound; and about 17 wt % to about 41 wt % of the urea-formaldehyde resin, based on a solids weight of the polyamide-epihalohydrin resin, the cationic styrene maleimide resin, and the urea-formaldehyde resin.

73 The resin composition, the fiber product, or the method according to any one of paragraphs 1-6, 13-62, or 66-70, wherein the resin composition comprises about 10 wt % to about 80 wt % of the polyamide-epihalohydrin resin, based on a combined solids weight of the polyamide-epihalohydrin resin, the cationic styrene maleimide resin, and the urea-formaldehyde resin.

74. The resin composition, the fiber product, or the method according to any one of paragraphs 1-6, 13-62, or 66-70, wherein the resin composition comprises about 10 wt % to about 80 wt % of the cationic styrene maleimide resin, based on a combined solids weight of the polyamide-epihalohydrin resin, the cationic styrene maleimide resin, and the urea-formaldehyde resin.

75. The resin composition, the fiber product, or the method according to any one of paragraphs 1-6, 13-62, or 66-70, wherein the resin composition comprises about 10 wt % to about 80 wt % of the urea-formaldehyde resin, based on a combined solids weight of the polyamide-epihalohydrin resin, the cationic styrene maleimide resin, and the urea-formaldehyde resin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:
1. A resin composition, comprising:
   a polyamide-epihalohydrin resin comprising a reaction product of a polyamidoamine and an epihalohydrin;
   a cationic styrene maleimide resin comprising a reaction product of a styrene maleic anhydride copolymer and an amine compound; and
   a urea-formaldehyde resin.

2. The resin composition of claim 1, wherein the cationic styrene maleimide resin has a weight average molecular weight of about 3,000 to about 200,000, and a styrene to maleimide molar ratio of about 1:1 to about 5:1.

3. The resin composition of claim 1, wherein the urea-formaldehyde resin has a weight average molecular weight of about 2,000 to about 500,000, and a formaldehyde to urea molar ratio of about 0.5:1 to about 1.2:1.

4. The resin composition of claim 1, wherein the resin composition comprises about 10 wt % to about 80 wt % of the polyamide-epihalohydrin resin, based on a combined solids weight of the polyamide-epihalohydrin resin, the cationic styrene maleimide resin, and the urea-formaldehyde resin.

5. The resin composition of claim 1, wherein the resin composition comprises about 10 wt % to about 80 wt % of the cationic styrene maleimide resin, based on a combined solids weight of the polyamide-epihalohydrin resin, the cationic styrene maleimide resin, and the urea-formaldehyde resin.

6. The resin composition of claim 1, wherein the resin composition comprises about 10 wt % to about 80 wt % of the urea-formaldehyde resin, based on a combined solids weight of the polyamide-epihalohydrin resin, the cationic styrene maleimide resin, and the urea-formaldehyde resin.

7. The resin composition of claim 1, wherein the cationic styrene maleimide resin has a weight average molecular weight of about 4,000 to about 150,000, and wherein the resin composition comprises about 25 wt % to about 70 wt % of the cationic styrene maleimide resin, based on a combined solids weight of the polyamide-epihalohydrin resin, the cationic styrene maleimide resin, and the urea-formaldehyde resin.

8. The resin composition of claim 1, wherein the resin composition comprises about 15 wt % to about 70 wt % of the cationic styrene maleimide resin, about 15 wt % to about 70 wt % of the polyamide-epihalohydrin resin, and about 15 wt % to about 70 wt % of the urea-formaldehyde resin, wherein all weight percent values are based on a combined solids weight of the cationic styrene maleimide resin, the polyamide-epihalohydrin resin, and the urea-formaldehyde resin.

9. The resin composition of claim 1, wherein the cationic styrene maleimide resin comprises one or more copolymers of styrene and dimethylaminopropylamine maleimide acetate.

10. The resin composition of claim 1, wherein the cationic styrene maleimide resin has the chemical formula:

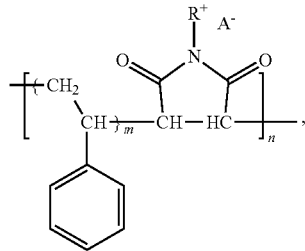

wherein:
R⁺ is a cationic molecular group;
A⁻ is an anion;
m is an integer of 1 to about 5; and
n is an integer of about 5 to about 800.

11. The resin composition of claim 10, wherein the cationic molecular group is a cationic ammonium group, wherein the anion is a carboxylate, and the carboxylate is an acetate anion, a citrate anion, an oxalate anion, a lactate anion, a formate anion, or any mixture thereof.

12. The resin composition of claim 1, wherein the resin composition comprises about 16 wt % to about 42 wt % of the cationic styrene maleimide resin, about 16 wt % to about 42 wt % of the polyamide-epihalohydrin resin, and about 16 wt % to about 42 wt % of the urea-formaldehyde resin, wherein all weight percent values are based on a combined solids weight of the cationic styrene maleimide resin, the polyamide-epihalohydrin resin, and the urea-formaldehyde resin.

13. The resin composition of claim 1, wherein the cationic styrene maleimide resin has the chemical formula:

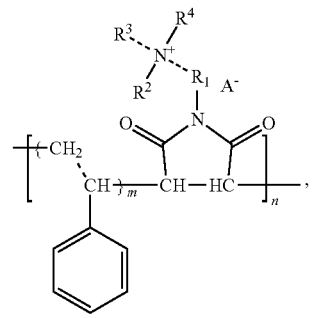

wherein:
R¹ is a substituted or unsubstituted organic diyl group;
R², R³, and R⁴ are independently selected from a hydrogen or a substituted or unsubstituted, linear or branched, cyclic, heterocyclic, or aromatic hydrocarbyl group;
A⁻ is an anion;
m is an integer of 1 to about 5; and
n is an integer of about 5 to about 800.

14. The resin composition of claim 1, wherein the cationic styrene maleimide resin has the chemical formula:

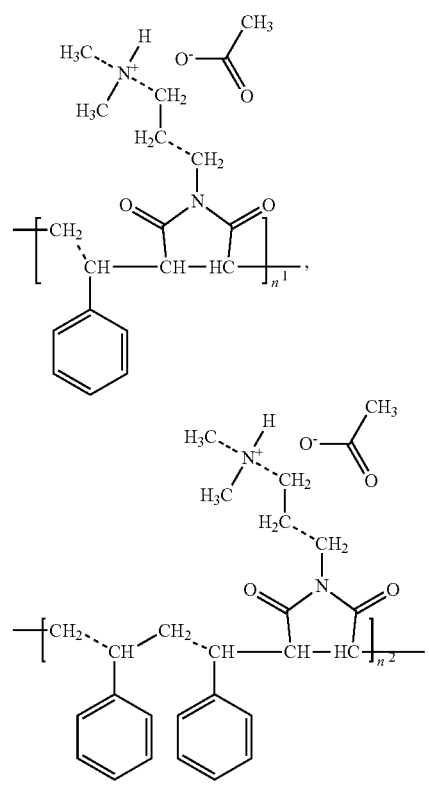

-continued

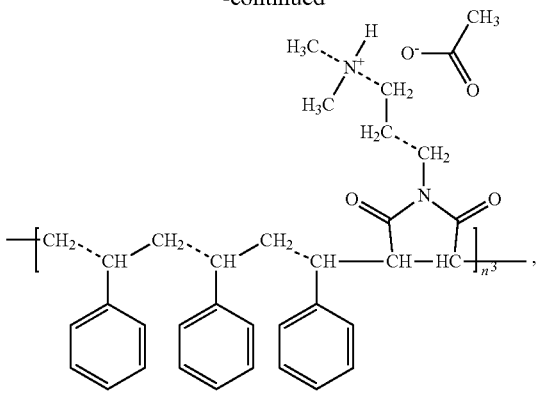

wherein:

A⁻ is an anion; and $n^1$, $n^2$, and $n^3$ are independently an integer of about 5 to about 800.

15. The resin composition of claim 14, wherein the anion is a carboxylate, wherein $n^1$ is about 5 to about 100, $n^2$ is about 20 to about 200, and $n^3$ is about 50 to about 300.

16. The resin composition of claim 1, further comprising a plurality of fibers.

17. A resin composition, comprising:
about 10 wt % to about 70 wt % of a polyamide-epihalohydrin resin comprising a reaction product of a polyamidoamine and an epihalohydrin;
about 10 wt % to about 70 wt % of a cationic styrene maleimide resin comprising a reaction product of a styrene maleic anhydride copolymer and an amine compound and having a styrene to maleimide molar ratio of about 1:1 to about 5:1; and
about 10 wt % to about 70 wt % of a urea-formaldehyde resin having a formaldehyde to urea molar ratio of about 0.5:1 to about 1.2:1, wherein all weight percent values are based on a combined solids weight of the polyamide-epihalohydrin resin, the cationic styrene maleimide resin, and the urea-formaldehyde resin.

18. The resin composition of claim 17, wherein the resin composition comprises about 16 wt % to about 42 wt % of the cationic styrene maleimide resin, about 16 wt % to about 42 wt % of the polyamide-epihalohydrin resin, and about 16 wt % to about 42 wt % of the urea-formaldehyde resin, wherein all weight percent values are based on a combined solids weight of the cationic styrene maleimide resin, the polyamide-epihalohydrin resin, and the urea-formaldehyde resin.

19. A fiber product, comprising:
a fiber web; and
an at least partially cured resin composition, wherein, prior to curing, the resin composition comprises:
a polyamide-epihalohydrin resin comprising a reaction product of a polyamidoamine and an epihalohydrin;
a cationic styrene maleimide resin comprising a reaction product of a styrene maleic anhydride copolymer and an amine compound; and
a urea-formaldehyde resin.

20. The fiber product of claim 19, wherein the fiber product has a dry tensile strength of about 1 kN/m to about 6 kN/m, a wet tensile strength of about 0.1 kN/m to about 1 kN/m, and a wet-to-dry tensile strength ratio of about 10 to about 20.

* * * * *